(12) United States Patent
Cui et al.

(10) Patent No.: US 10,273,391 B2
(45) Date of Patent: Apr. 30, 2019

(54) DELAYED CURING CATALYSTS FOR THIOL/EPOXY REACTIONS

(71) Applicant: PRC-DeSoto International, Inc., Sylmar, CA (US)

(72) Inventors: Weibin Cui, Rancho Palos Verdes, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 167 days.

(21) Appl. No.: 15/403,623

(22) Filed: Jan. 11, 2017

(65) Prior Publication Data

US 2018/0194979 A1    Jul. 12, 2018

(51) Int. Cl.
*C08G 75/02* (2016.01)
*C08G 75/12* (2016.01)
*C09J 181/02* (2006.01)

(52) U.S. Cl.
CPC ............ *C09J 181/02* (2013.01); *C08G 75/02* (2013.01); *C08G 75/12* (2013.01)

(58) Field of Classification Search
CPC ........ C08G 18/28; C08G 75/04; C08G 75/02; C08G 75/12; C09J 181/02
See application file for complete search history.

(56) References Cited

U.S. PATENT DOCUMENTS

| | | |
|---|---|---|
| 4,366,307 A | 12/1982 | Singh et al. |
| 4,609,762 A | 9/1986 | Morris et al. |
| 4,623,711 A | 11/1986 | Morris et al. |
| 5,225,472 A | 7/1993 | Cameron et al. |
| 6,153,719 A | 11/2000 | Abbey et al. |
| 6,172,179 B1 | 1/2001 | Zook et al. |
| 6,509,418 B1 | 1/2003 | Zook et al. |
| 6,525,168 B2 | 2/2003 | Zook et al. |
| 7,009,032 B2 | 3/2006 | Bojkova et al. |
| 7,879,955 B2 | 2/2011 | Rao et al. |
| 8,138,273 B2 | 3/2012 | Rao et al. |
| 8,952,124 B2 | 2/2015 | Rao et al. |
| 9,006,360 B2 | 4/2015 | Keledjian et al. |
| 2004/0247792 A1 | 12/2004 | Sawant |
| 2006/0175005 A1* | 8/2006 | Sawant .................. C08L 81/02 156/307.1 |
| 2010/0010133 A1 | 1/2010 | Zook et al. |
| 2010/0041839 A1 | 2/2010 | Anderson et al. |
| 2011/0319559 A1 | 12/2011 | Kania et al. |
| 2012/0234205 A1 | 9/2012 | Hobbs et al. |
| 2012/0238707 A1 | 9/2012 | Hobbs et al. |
| 2015/0240122 A1 | 8/2015 | Rao et al. |
| 2015/0240140 A1 | 8/2015 | Rao et al. |

* cited by examiner

*Primary Examiner* — Shane Fang
(74) *Attorney, Agent, or Firm* — William R. Lamhert

(57) ABSTRACT

Thiol-terminated polythioether compositions and sealants exhibit an extended working time and rapidly cure at room temperature at the end of the working time are disclosed. The compositions comprise a combination of pyridine catalysts.

25 Claims, 4 Drawing Sheets

DELAYED CURING CATALYSTS FOR THIOL/EPOXY REACTIONS

FIELD

The present disclosure relates to sulfur-containing prepolymer compositions and to cured sealants prepared from the sulfur-containing prepolymer compositions having extended working time and fast cure rates.

BACKGROUND

Sulfur-containing prepolymer such as polythioether prepolymers and polysulfide prepolymers are known to be useful in aerospace sealant applications. Aerospace sealants must meet a number of challenging performance requirements that including adhesion, tensile strength, elongation, fuel resistance, and high temperature stability. Typical sulfur-containing prepolymer-based sealants are characterized by a relatively short working time of less than 12 hours and can take several weeks to fully cure. For example, aerospace sealants based on thiol-epoxy reactions can be catalyzed by amines. Strong base catalysts such as 1,4-diazabicyclo[2.2.2]octane exhibit a working time of only a few hours. Weak amine catalysts are ineffective in providing a cured product.

Sulfur-containing-based sealant formulations exhibiting extended working time and that cure rapidly to a hardness of at least 30 Shore A at the end of the useful working time are desired.

These objectives can be achieved using latent amine catalysts such as disclosed, for example, in U.S. Pat. No. 9,006,360, which is incorporated by reference in its entirety. However, encapsulated catalysts can be difficult to manufacture and the quality can be difficult to maintain on a commercial scale. Blending encapsulated catalysts homogenously throughout a sealant can also present challenges. For example, heat and/or shear generated during mixing can prematurely rupture and/or release the amine catalysts. Once mixed, the catalyst can also diffuse from the encapsulant causing premature curing. Finally, the encapsulating material can compromise the properties of the cured sealant.

Thiol-epoxy systems having a working time of one to three (1 to 3) weeks, that rapidly cure to a hardness of at least 30 Shore A after the end of the working time, and that meet the demanding performance requirements of aerospace sealants when fully cured are desired.

SUMMARY

According to the present invention, a composition comprises: (a) a thiol-terminated sulfur-containing prepolymer; (b) a polyepoxide; and (c) at least two pyridine catalysts.

According to the present invention, a cured sealant is prepared from a composition according to the present invention.

According to the present invention, method of sealing one or more surfaces, comprise: applying a composition according to the present invention to one or more surfaces; and curing the applied composition to seal the one or more surfaces.

According to the present invention, a part comprises a cured sealant prepared from a composition according to the present invention.

BRIEF DESCRIPTION OF THE DRAWINGS

Those skilled in the art will understand that the drawings described herein are for illustration purposes only. The drawings are not intended to limit the scope of the present disclosure.

DETAILED DESCRIPTION

Figure 1:
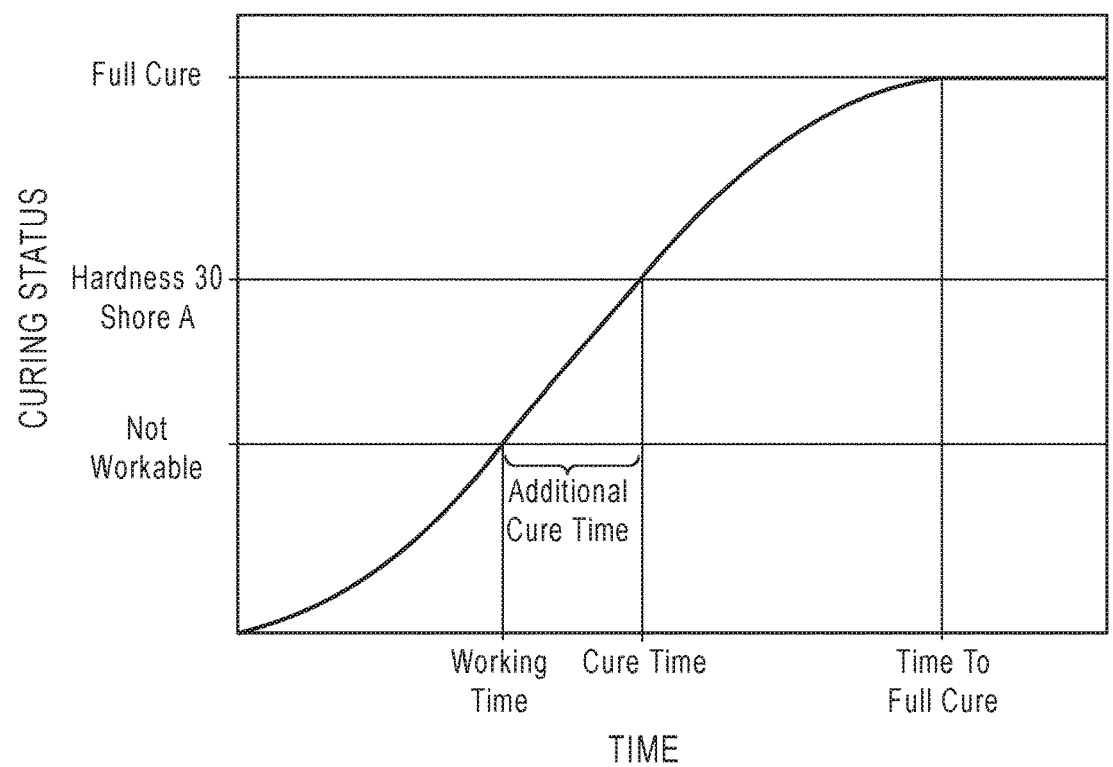
FIG. 1 is a graph showing the curing status relative viscosity/hardness of a curing sealant composition with time.

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("-") that is not between two letters or symbols is used to indicate a point of bonding for a substituent or between two atoms. For example, —CONH$_2$ is attached through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 carbon atoms ($C_{1-3}$). It will be appreciated that a branched alkanediyl has a minimum of three carbon atoms. An alkanediyl can be, for example, $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—CH$_2$—), ethane-1,2-diyl (—CH$_2$CH$_2$—), propane-1,3-diyl and isopropane-1,2-diyl (e.g., —CH$_2$CH$_2$CH$_2$— and —CH(CH$_3$)CH$_2$—), butane-1,4-diyl (—CH₂CH₂CH₂CH₂—), pentane-1,5-diyl (—CH₂CH₂CH₂CH₂CH₂—), hexane-1,6-diyl (—CH₂CH₂CH₂CH₂CH₂CH₂—), heptane-1,7-diyl, octane-1,8-diyl, nonane-1,9-diyl, decane-1,10-diyl, and dodecane-1,12-diyl.

"Alkanecycloalkane" refers to a compound having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$ cycloalkyl or cycloalkanediyl, $C_{5-6}$ cycloalkyl or cycloalkanediyl, or cyclohexyl or cyclohexanediyl. Each alkyl and/or alkanediyl group(s) can be $C_{1-6}$ alkyl or alkanediyl, $C_{1-4}$ alkyl or alkanediyl, $C_{1-3}$ alkyl or alkanediyl, methyl, methanediyl, ethyl, or ethane-1,2-diyl. An alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkyl" refers to a monovalent group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. It will be appreciated that a branched alkyl has at least three carbon atoms.

"Cycloalkanediyl" refers to a divalent group. A cycloalkanediyl group can be, for example, $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl, and cyclohexane-1,2-diyl.

"PHR" refers to the parts by weight of a compound, such as a bipyridine, per 100 parts by weight of another compound, such as a thiol-terminated polythioether prepolymer, in a composition.

"Prepolymer" refers to oligomers, homopolymers, and copolymers. For thiol-terminated prepolymers, molecular weights are number average molecular weights "Mn" as determined by end group analysis using iodine titration. For prepolymers that are not thiol-terminated, the number average molecular weights are determined by gel permeation chromatography using polystyrene standards. A prepolymer such as a thiol-terminated sulfur-containing prepolymer provided by the present disclosure can be combined with a curing agent to provide a curable composition, which can cure to provide a cured polymer network. Prepolymers are liquid at room temperature (25° C.) and pressure (760 torr).

Specific gravity is determined according to ASTM D1475.

A "curable composition" refers to a composition that comprises at least two reactants capable of reacting to form a cured composition. For example, a curable composition can comprise a thiol-terminated polythioether prepolymer and a polyepoxide capable of reacting to form a cured polymer. A curable composition may include a catalyst for the curing reaction and other components such as, for example, fillers, pigments, and adhesion promoters. A curable composition may be curable at room temperature, or may require exposure to elevated temperature such as a temperature above room temperature or other condition(s) to initiate and/or to accelerate the curing reaction. A curable composition may initially be provided as a two-part composition including, for example, a separate base component and an accelerator component. The base composition can contain one of the reactants participating in the curing reaction such as a thiol-terminated polythioether prepolymer and the accelerator component can contain the other reactant such as a polyepoxide. The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec). A Class B sealant composition, which is suitable for fillet seal applications, can be characterized by a viscosity from 4,500 poise to 20,000 poise (450 Pa-sec to 2,000 Pa-sec). A Class C sealant composition, which is suitable for fay seal applications, can be characterized by a viscosity from 500 poise to 4,500 poise (50 Pa-sec to 450 Pa-sec). The viscosity of the compositions is measured as described herein. After the two components of a sealant system are combined and mixed, the curing reaction can proceed and the viscosity of the curable composition can increase and at some point will no longer be workable, as described herein. The duration between when the two components are mixed to form the curable composition and when the curable composition can no longer be reasonably or practically applied to a surface for its intended purpose can be referred to as the working time. As can be appreciated, the working time can depend on a number of factors including, for example, the curing chemistry, the catalyst used, the application method, and the temperature. Once a curable composition is applied to a surface (and during application), the curing reaction can proceed to provide a cured composition. A cured composition develops a tack-free surface, cures, and then fully cures over a period of time. A curable composition can be considered to be cured when the hardness of the surface is at least 30 Shore A for a Class B sealant or a Class C sealant. After a sealant has cured to a hardness of 30 Shore A it can take from several days to several weeks for a curable composition fully cure. A composition is considered fully cured when the hardness no longer increases. Depending on the formulation, a fully cured sealant can exhibit, for example, a hardens from 40 Shore A to 70 Shore A.

Compositions such as sealants provided by the present disclosure can have a long working time and a short additional cure time. After combining the reactive components such as a thiol-terminated sulfur-containing prepolymer, a polyepoxide, and a at least two pyridine catalysts, a curable composition will begin to cure and the viscosity of the curing composition will increase over time. The duration from when the curable composition is first mixed to the time the curable composition is no longer workable is referred to as the "working time." By workable is meant that the composition can no longer be practically applied to a surface using the intended application method. For example, a Class C sealant is designed for application by a roller or combed tooth spreader, and at the end of the working time the sealant cannot be practically applied to a surface using a roller or combed tooth spreader. For example, a Class C sealant that exhibits an initial viscosity from 500 poise to 4,500 poise (50 Pa-sec to 450 Pa-sec) may not be workable when the viscosity is greater than 5,000 poise (500 Pa-sec), 6,000 poise (600 Pa-sec), 7,000 poise (700 Pa-sec), or 8,000 poise (800 Pa-sec). After the curable composition is applied to a surface, adhesion to the surface develops and the exposed surface of the curing composition becomes tack free. Tack free time can be determined according to AS5127/1 (5.8) (Aerospace Standard Test Methods for Aerospace Sealants). Over time, the composition partially cures to hardness 30 Shore A, and then with additional time fully cures to a hardness, for example, of at least 40 Shore A. Hardness can be determined according to AS5127/1 (5.9). The duration from when the curable composition is first mixed to the time the curing composition exhibits a hardness of at least 30 Shore A is referred to as the "cure time". The duration from the end of the working time until the composition is partially cured, i.e. exhibiting hardness 30 Shore A, is referred to as the "additional cure time." At this point the partially cured sealant will resist modest abrasion and impact. The duration from the when the curable composition is first mixed until the composition is fully cured is referred to as the "time to full cure." A sealant is fully cured when the hardness reaches a maximum and does not continue to increase. After the "cure time" it can take several weeks for a sealant to fully cure. A fully cured sealant can exhibit a hardness, for example, of at least 40 Shore A, a hardness greater than 45 Shore A, or greater than 50 Shore A.

The various times and durations associated with a curing sealant are further defined with reference to FIG. 1. FIG. 1 shows the curing status of a curing sealant with time. After the reactive sealant components are mixed, the viscosity of the curing sealant composition increases and the composition begins to gel. At some point, the curing sealant can no longer be applied to a surface using an intended method. This is referred to as the end of the working time. The "working time" is defined as the duration from when the sealant composition is first mixed to the time when the sealant can no longer be practically applied to a surface. The sealant viscosity continues to increase, develops a tack-free surface, and develops a hardness. The duration between when the sealant is first mixed to the time the sealant develops a hardness of 30 Shore A is referred to as the "cure time." The duration between the end of the "working time" and when the sealant develops a hardness of 30 Shore A is referred to as the "additional cure time." The "cure time" is the sum of the "working time" and the "additional time to cure." Then, over time the hardness of the sealant continues to increase to a maximum value. The sealant is considered to be fully cured when the hardness of the sealant reaches a maximum value and does not continue to appreciably increase. The duration between when the sealant is first mixed to when the sealant is fully cured is referred to as the "time to full cure."

Reference is now made to certain embodiments of compositions and methods. The disclosed embodiments are not intended to be limiting of the claims. To the contrary, the claims are intended to cover all alternatives, modifications, and equivalents.

Polyepoxide-cured, thiol-terminated sulfur-containing prepolymer-based sealants that include at least two pyridine catalysts exhibit extended working time and, when fully cured, meet the demanding performance requirements of aerospace sealant applications such as AMS 3281 (Aerospace Material Specification). Examples of other relevant aerospace sealant specifications include Mil-S-22473E, AMS 3265B, AMS 3269, AMS 3279, and AMS 3277.

Compositions provided by the present disclosure can comprise a thiol-terminated sulfur-containing prepolymer, a polyepoxide curing agent, and at least two pyridine catalysts. A composition can be formulated as a sealant, such as an aerospace sealant.

Compositions and sealant formulations provided by the present disclosure can comprise a thiol-terminated sulfur-containing prepolymer such as a thiol-terminated polythioether prepolymer, a thiol-terminated polysulfide, a thiol-terminated sulfur-containing polyformal prepolymer, or a combination of any of the foregoing.

Examples of suitable thiol-terminated polythioether prepolymers are disclosed, for example, in U.S. Pat. No. 6,172,179, which is incorporated by reference in its entirety.

A thiol-terminated polythioether prepolymer can comprise a thiol-terminated polythioether prepolymer comprising the chemical structure of Formula (1):

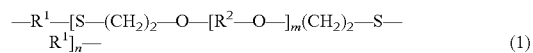

$$-R^1-[S-(CH_2)_2-O-[R^2-O-]_m(CH_2)_2-S-R^1]_n- \quad (1)$$

wherein,
each $R^1$ independently comprises a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a divalent heterocyclic group, or a $-[(CHR^3)_p-X-]_q(CHR^3)_r-$ group, wherein each $R^3$ comprises hydrogen or methyl;
each $R^2$ independently comprises a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a divalent heterocyclic group, or a $-[(CH_2)_p-X-]_q(CH_2)_r-$ group;
each X is independently comprises O, S, or NR, wherein R comprises hydrogen or methyl;
m ranges from 0 to 50;
n is an integer ranging from 1 to 60;
p is an integer ranging from 2 to 6;
q is an integer ranging from 1 to 5; and
r is an integer ranging from 2 to 10.

In prepolymers of Formula (1), $R^1$ can be $-[(CHR^3)_p-X-]_q(CHR^3)_r-$ wherein each X can independently comprise O and S. In prepolymers of Formula (1), $R^1$ can be $-[(CHR^3)_p-X-]_q(CHR^3)_r-$ each X can be O or each X can be S.

In prepolymers of Formula (1), $R^1$ can be $-[(CH_2)_p-X-]_q(CH_2)_r-$ wherein each X can independently comprise O and S. In prepolymers of Formula (1), $R^1$ can be $-[(CH_2)_p-X-]_q(CH_2)_r-$ each X can be O or each X can be S.

In prepolymers of Formula (1), $R^1$ can be $-[(CH_2)_p-X-]_q(CH_2)_r-$ where p can be 2, X can be O, q can be 2, r can be 2, $R^2$ can be ethanediyl, m can be 2, and n can be 9.

In prepolymers of Formula (1), each $R^1$ can be derived from 1,8-dimercapto-3,6-dioxaoctane (DMDO), each $R^1$ can be derived from dimercaptodiethylsulfide (DMDS), or a combination thereof.

In prepolymers of Formula (1), each m can independently be an integer from 1 to 3. Each m can be the same and can be 1, 2, or 3.

In prepolymers of Formula (1), n can be an integer from 1 to 30, an integer from 1 to 20, an integer from 1 to 10, or an integer from 1 to 5. In addition, n may be any integer from 1 to 60.

In prepolymers of Formula (1), each p can independently be 2, 3, 4, 5, and 6. Each p can be the same and can be 2, 3, 4, 5, or 6.

In prepolymers of Formula (1), each q can independently be 1, 2, 3, 4, or 5. Each q can be the same and can be 1, 2, 3, 4, or 5.

In prepolymers of Formula (1), each r can independently be 2, 3, 4, 5, 6, 7, 8, 9, or 10.

Each r can be the same and can be 2, 3, 4, 5, 6, 7, 8, 9, or 10. In prepolymers of Formula (1), each r can independently be an integer from 2 to 4, from 2 to 6, or from 2 to 8.

In prepolymers of Formula (1), each R2 can independently comprise a C2-10 n-alkanediyl group, a C3-6 branched alkanediyl group, or a —[(CH2)p-X-]q(CH2)r- group.

In prepolymers of Formula (1), each R2 can independently comprise a C2-10 n-alkanediyl group.

In prepolymers of Formula (1), each $R^2$ can independently comprise a —$[(CH_2)_p-X-]_q(CH_2)_r$— group, where each X can be O or S.

A thiol-terminated polythioether prepolymer can comprise a thiol-terminated polythioether prepolymer of Formula (2a), a thiol-terminated polythioether prepolymer of Formula (2b), or a combination thereof:

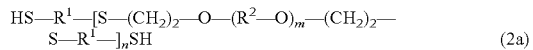

(2a)

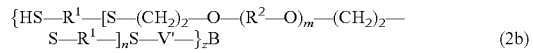

(2b)

wherein,
each $R^1$ independently comprises $C_{2-10}$ alkanediyl, $C_{6-8}$ cycloalkanediyl, $C_{6-14}$ alkanecycloalkanediyl, $C_{5-8}$ heterocycloalkanediyl, or —$[(CHR^3)_p-X-]_q(CHR^3)_r$—, wherein,
p is an integer from 2 to 6;
q is an integer from 1 to 5;
r is an integer from 2 to 10;
each $R^3$ independently comprises hydrogen or methyl; and
each X independently comprises O, S, or NR, wherein R comprises hydrogen or methyl;
each $R^2$ is independently comprises $C_{1-10}$ alkanediyl, $C_{6-8}$ cycloalkanediyl, $C_{6-14}$ alkanecycloalkanediyl, or —$[(CHR^3)_p-X-]_q(CHR^3)_r$—, wherein p, q, r, $R^3$, and X are defined as for $R^1$;
m is an integer from 0 to 50;
n is an integer from 1 to 60;
B represents a core of a z-valent, polyfunctionalizing agent B(—V)$_z$ wherein,
z is an integer from 3 to 6; and
each V is a moiety comprising a terminal group reactive with a thiol; and
each —V'— is derived from the reaction of —V with a thiol.

In prepolymers of Formula (2a) and Formula (2b), $R^1$ can be —$[(CH_2)_p-X-]_q(CH_2)_r$—, where p can be 2, X can be O, q can be 2, r can be 2, $R^2$ can be ethanediyl, m can be 2, and n can be 9.

In prepolymers of Formula (2a) and Formula (2b), $R^1$ can comprise $C_{2-6}$ alkanediyl or —$[(CHR^3)_p-X-]_q(CHR^3)_r$—.

In prepolymers of Formula (2a) and Formula (2b), $R^1$ can be —$[(CHR^3)_p-X-]_q(CHR^3)_r$—, X can be O or X can be S.

In prepolymers of Formula (2a) and Formula (2b), where $R^1$ can be —$[(CHR^3)_p-X-]_q(CHR^3)_r$—, p can be 2, r can be 2, q can be 1, and X can be S; or wherein p can be 2, q can be 2, r can be 2, and X can be O; or p can be 2, r can be 2, q can be 1, and X can be O.

In prepolymers of Formula (2a) and Formula (2b), $R^1$ can be —$[(CHR^3)_p-X-]_q(CHR^3)_r$—, and each $R^3$ can be hydrogen or at least one $R^3$ can be methyl.

In prepolymers of Formula (2a) and Formula (2b), each $R^1$ can be the same, or at least one $R^1$ can be different.

In prepolymers of Formula (2a) and Formula (2b), each m can be independently an integer from 1 to 3. Each m can be the same and is can be 1, 2, or 3.

In prepolymers of Formula (2a) and Formula (2b), n can be an integer from 1 to 30, an integer from 1 to 20, an integer from 1 to 10, or an integer from 1 to 5. The variable n may be any integer from 1 to 60.

In prepolymers of Formula (2a) and Formula (2b), each p can independently be 2, 3, 4, 5, and 6. Each p can be the same and can be 2, 3, 4, 5, or 6.

In prepolymers of Formula (2a) and Formula (2b), each q can independently be 1, 2, 3, 4, or 5. Each q can be the same and can be 1, 2, 3, 4, or 5.

In prepolymers of Formula (2a) and Formula (2b), each r can independently be 2, 3, 4, 5, 6, 7, 8, 9, or 10.

Each r can be the same and can be 2, 3, 4, 5, 6, 7, 8, 9, or 10. In prepolymers of Formula (1), each r can independently be an integer from 2 to 4, from 2 to 6, or from 2 to 8.

Various methods can be used to prepare thiol-terminated polythioether prepolymers of Formula (2a) and Formula (2b). Examples of suitable thiol-terminated polythioether prepolymers, and methods for their production, are described in U.S. Pat. No. 6,172,179. Such thiol-terminated polythioether prepolymers may be difunctional, that is, linear prepolymers having two terminal thiol groups, or can be polyfunctional, that is, branched prepolymers having three or more terminal thiol groups. Suitable thiol-terminated polythioether prepolymers are commercially available, for example, as Permapol® P3.1E, from PRC-DeSoto International Inc., Sylmar, Calif.

A thiol-terminated polythioether prepolymer may comprise a mixture of different thiol-terminated polythioether prepolymers and the thiol-terminated polythioether prepolymers may have the same or different functionality. A thiol-terminated polythioether prepolymer or combination of thiol-terminated polythioether prepolymers can have an average functionality from 2 to 6, from 2 to 4, from 2 to 3, from 2.05 to 2.8, or from 2.05 to 2.5. For example, a thiol-terminated polythioether prepolymer can comprise a difunctional thiol-terminated polythioether prepolymer, a trifunctional thiol-terminated polythioether prepolymer, or a combination thereof.

A thiol-terminated polythioether prepolymer can be prepared by reacting a polythiol and a diene such as a divinyl ether, and the respective amounts of the reactants used to prepare the polythioethers can be chosen to yield terminal thiol groups. Thus, in some cases, (n or >n, such as n+1) moles of a polythiol, such as a dithiol or a mixture of at least two different dithiols and 0.05 moles to 1 moles, such as 0.1 moles to 0.8 moles, of a thiol-terminated polyfunctionalizing agent may be reacted with (n) moles of a diene, such as a divinyl ether, or a combination of at least two different dienes, such as a combination of two different divinyl ethers. A thiol-terminated polyfunctionalizing agent can be present in the reaction mixture in an amount sufficient to provide a thiol-terminated polythioether prepolymer having an average thiol functionality of from 2.05 to 3, such as from 2.1 to 2.8, or from 2.1 to 2.6. Examples of polyfunctionalizing agents are described below.

A reaction used to prepare a thiol-terminated polythioether prepolymer may be catalyzed by a free radical catalyst. Suitable free radical catalysts include azo compounds, for example, azobisnitrile compounds such as azo(bis)isobutyronitrile (AIBN); organic peroxides, such as benzoyl peroxide and tert-butyl peroxide; and inorganic peroxides, such as hydrogen peroxide. The reaction can also be effected by irradiation with ultraviolet light either with or without a radical initiator/photosensitizer. Ionic catalysis methods, using either inorganic or organic bases, e.g., triethylamine, may also be used.

Suitable thiol-terminated polythioether prepolymers may be produced by reacting a divinyl ether or combination of divinyl ethers with an excess of dithiol or a combination of dithiols.

A thiol-terminated polythioether prepolymer can comprise the reaction product of reactants comprising:

(a) a dithiol of Formula (3):

$$HS—R^1—SH \quad (3)$$

wherein,
$R^1$ comprises $C_{2-6}$ alkanediyl, $C_{6-8}$ cycloalkanediyl, $C_{6-10}$ alkanecycloalkanediyl, $C_{5-8}$ heterocycloalkanediyl, or $—[(CHR^3)_p—X—]_q(CHR^3)_r—$; wherein,
each $R^3$ independently comprises hydrogen or methyl;
each X independently comprises —O—, —S—, or —NR— wherein R comprises hydrogen or methyl;
p is an integer from 2 to 6;
q is an integer from 1 to 5; and
r is an integer from 2 to 10; and (b) a divinyl ether of Formula (4):

$$CH_2=CH—O—[R^2—O]_m—CH=CH_2 \quad (4)$$

wherein,
each $R^2$ independently comprises $C_{1-10}$ alkanediyl, $C_{6-8}$ cycloalkanediyl, $C_{6-14}$ alkanecycloalkanediyl, or $—[(CHR^3)_p—X—]_q(CHR^3)_r—$, wherein p, q, r, $R^3$, and X are as defined above; and
m is an integer from 0 to 50.

The reactants can further comprise (c) a polyfunctional compound such as a polyfunctional compound $B(—V)_z$, where B, —V, and z are as defined herein.

Dithiols suitable for use in preparing thiol-terminated polythioether prepolymers include those having the structure of Formula (3):

$$HS—R^1—SH \quad (3)$$

wherein,
$R^1$ comprises $C_{2-6}$ alkanediyl, $C_{6-8}$ cycloalkanediyl, $C_{6-10}$ alkanecycloalkanediyl, $C_{5-8}$ heterocycloalkanediyl, or $—[(CHR^3)_p—X—]_q(CHR^3)_r—$; wherein,
each $R^3$ independently comprises hydrogen or methyl;
each X independently comprises O, S, or NR wherein R comprises hydrogen or methyl;
p is an integer from 2 to 6;
q is an integer from 1 to 5; and
r is an integer from 2 to 10.

In dithiols of Formula (3), $R^1$ can comprise $—[(CHR^3)_p—X—]_q(CHR^3)_r—$.

In dithiols of Formula (3), X can comprise O and S, and thus $—[(CHR^3)_p—X—]_q(CHR^3)_r—$ in Formula (3) can be $—[(CHR^3)_p—O—]_q(CHR^3)_r—$ or $—[(CHR^3_2)_p—S—]_q(CHR^3)_r—$. P and r can be equal, such as where p and r can be both two.

In dithiols of Formula (3), $R^1$ can comprise $C_{2-6}$ alkanediyl and $—[(CHR^3)_p—X—]_q(CHR^3)_r—$.

In dithiols of Formula (3), $R^1$ can be $—[(CHR^3)_p—X—]_q(CHR^3)_r—$, and X can be O, or X can be S.

In dithiols of Formula (3) where $R^1$ can be $—[(CHR^3)_p—X—]_q(CHR^3)_r—$, p can be 2, r can be 2, q can be 1, and X can be S; or p can be 2, q can be 2, r can be 2, and X can be O; or p can be 2, r can be 2, q can be 1, and X can be O.

In dithiols of Formula (3) where $R^1$ can be $—[(CHR^3)_p—X—]_q(CHR^3)_r—$, each $R^3$ can be hydrogen, or at least one $R^3$ can be methyl.

In dithiols of Formula (3), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis (ethan-1-thiol)), and combinations thereof.

In dithiols of Formula (3), each p can independently comprise 2, 3, 4, 5, and 6. Each p can be the same and can be 2, 3, 4, 5, or 6.

In dithiols of Formula (3) each q can independently be 1, 2, 3, 4, or 5. Each q can be the same and can be 1, 2, 3, 4, or 5.

In dithiols of Formula (3), each r can independently be 2, 3, 4, 5, 6, 7, 8, 9, or 10, Each r can be the same and can be 2, 3, 4, 5, 6, 7, 8, 9, or 10. In prepolymers of Formula (1), each r can independently be an integer from 2 to 4, from 2 to 6, or from 2 to 8.

In divinyl ethers of Formula (4), each m can be independently an integer from 1 to 3. Each m can be the same and is can be 1, 2, or 3.

In divinyl ethers of Formula (4), each R2 can independently comprise a C2-10 n-alkanediyl group, a C3-6 branched alkanediyl group, or a $—[(CH2)p-X-]q(CH2)r-$ group.

In divinyl ethers of Formula (4), each R2 can independently comprise a C2-10 n-alkanediyl group.

In divinyl ethers of Formula (4), each R2 can independently comprise a $—[(CH_2)p-X-]q(CH_2)r-$ group, where each X can be O or S.

In divinyl ethers of Formula (4), each R2 can independently comprise a $—[(CH_2)p-X-]q(CH_2)r-$ group, where each X can be O or S, and each p can independently be 2, 3, 4, 5, and 6. Each p can be the same and can be 2, 3, 4, 5, or 6.

In divinyl ethers of Formula (4), each R2 can independently comprise a $—[(CH_2)p-X-]q(CH_2)r-$ group, where each X can be O or S, and each q can independently be 1, 2, 3, 4, or 5. Each q can be the same and can be 1, 2, 3, 4, or 5.

In divinyl ethers of Formula (4), each R2 can independently comprise a $—[(CH_2)p-X-]q(CH_2)r-$ group, where each X can be O or S, and each r can independently be 2, 3, 4, 5, 6, 7, 8, 9, or 10, Each r can be the same and can be 2, 3, 4, 5, 6, 7, 8, 9, or 10. In prepolymers of Formula (1), each r can independently be an integer from 2 to 4, from 2 to 6, or from 2 to 8.

Examples of suitable dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

A dithiol may have one or more pendent groups comprising a lower (e.g., $C_{1-6}$) alkyl group, a lower alkoxy group, or a hydroxyl group. Suitable alkyl pendent groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (3), $R^1$ is —$[(CH_2)_p$—X—$]_q(CH_2)_r$—, wherein p is 2, r is 2, q is 1, and X is S); dimercaptodioxaoctane (DMDO) (in Formula (3), $R^1$ is —$[(CH_2)_p$—X—$]_q(CH_2)_r$—, wherein p is 2, q is 2, r is 2, and X is O); and 1,5-dimercapto-3-oxapentane (in Formula (3), $R^1$ is —$[(CH_2)_p$—X—$]_q(CH_2)_r$—, wherein p is 2, r is 2, q is 1, and X is O). It is also possible to use dithiols that include both heteroatoms in the carbon backbone and pendent alkyl groups, such as methyl groups. Such compounds include, for example, methyl-substituted DMDS, such as HS—$CH_2CH(CH_3)$—S—$CH_2CH_2$—SH, HS—$CH(CH_3)CH_2$—S—$CH_2CH_2$—SH and dimethyl substituted DMDS, such as HS—$CH_2CH(CH_3)$—S—$CH(CH_3)CH_2$—SH and HS—$CH(CH_3)CH_2$—S—$CH_2CH(CH_3)$—SH.

Suitable divinyl ethers for preparing thiol-terminated polythioethers include, for example, divinyl ethers of Formula (4):

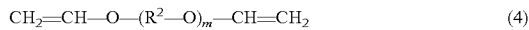

$$CH_2=CH-O-(R^2-O)_m-CH=CH_2 \quad (4)$$

where each $R^2$ independently comprises $C_{1-10}$ alkanediyl, $C_{6-8}$ cycloalkanediyl, $C_{6-14}$ alkanecycloalkanediyl, or —$[(CHR^3)_p$—X—$]_q(CHR^3)_r$—, where each $R^3$ can independently comprise hydrogen or methyl; each X can independently comprise O, S, or NR wherein R can comprise hydrogen or methyl; p can be an integer from 2 to 6; q can be an integer from 1 to 5; and r can be an integer from 2 to 10.

Suitable divinyl ethers include, for example, compounds having at least one oxyalkanediyl group —$R^2$—O—, such as from 1 to 4 oxyalkanediyl groups, i.e., compounds in which m in Formula (4) is an integer ranging from 1 to 4. The variable m in Formula (4) can be an integer ranging from 2 to 4. It is also possible to employ commercially available divinyl ether mixtures that are characterized by a non-integral average value for the number of oxyalkanediyl units per molecule. Thus, m in Formula (4) can also take on rational number values ranging from 0 to 10.0, such as from 1.0 to 10.0, from 1.0 to 4.0, or from 2.0 to 4.0.

Examples of suitable vinyl ethers include ethylene glycol divinyl ether (EG-DVE) ($R^2$ in Formula (4) is ethanediyl and m is 1), butanediol divinyl ether (BD-DVE) ($R^2$ in Formula (4) is butanediyl and m is 1), hexanediol divinyl ether (HD-DVE) ($R^2$ in Formula (4) is hexanediyl and m is 1), diethylene glycol divinyl ether (DEG-DVE) ($R^2$ in Formula (4) is ethanediyl and m is 2), triethylene glycol divinyl ether ($R^2$ in Formula (4) is ethanediyl and m is 3), tetraethylene glycol divinyl ether ($R^2$ in Formula (4) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendent groups which can comprise alkyl groups, hydroxyl groups, alkoxy groups, or amine groups.

Divinyl ethers in which $R^2$ in Formula (4) is $C_{3-6}$ branched alkanediyl may be prepared by reacting a polyhydroxyl compound with acetylene. Examples of divinyl ethers of this type include compounds in which $R^2$ in Formula (4) is an alkyl-substituted methanediyl group such as CH(—$CH_3$), or an alkyl-substituted ethanediyl.

Two or more types of divinyl ethers of Formula (4) may be used. Thus, two dithiols of Formula (3) and one divinyl ethers of Formula (4), one dithiol of Formula (3) and two divinyl ethers of Formula (4), two dithiols of Formula (3) and two divinyl ethers of Formula (4), and more than two compounds of one or both Formula (3) and Formula (4), may be used to produce a variety of thiol-terminated polythioethers prepolymers.

The divinyl ether(s) can comprise, for example, from 20 mole percent to less than 50 mole percent of the reactants used to prepare a thiol-terminated polythioether prepolymer, or 30 mole percent to less than 50 mole percent.

Relative amounts of dithiols and divinyl ethers can be selected to yield polythioether prepolymers having terminal thiol groups. Thus, a dithiol of Formula (3) or a mixture of at least two different dithiols of Formula (3), can be reacted with of a divinyl ether of Formula (4) or a mixture of at least two different divinyl ethers of Formula (4) in relative amounts such that the molar ratio of thiol groups to alkenyl groups is greater than 1:1, such as from 1.1:1.0 to 2.0:1.0.

The reaction between dithiols and divinyl ethers and/or polythiols and polyvinyl ethers may be catalyzed by a free radical catalyst, an ionic catalyst, or ultraviolet radiation. Suitable free radical catalysts include, for example, azo compounds, for example azobisnitriles such as azo(bis) isobutyronitrile (AIBN); organic peroxides such as benzoyl peroxide and t-butyl peroxide; and inorganic peroxides such as hydrogen peroxide. In certain reactions, the catalyst does not comprise acidic or basic compounds, and does not produce acidic or basic compounds upon decomposition. Examples of suitable free-radical catalysts include azo-type catalysts, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other suitable free-radical catalysts include alkyl peroxides, such as t-butyl peroxide. The reaction may also be effected by irradiation with ultraviolet light either with or without a cationic photoinitiating moiety.

Thiol-terminated polythioether prepolymers provided by the present disclosure may be prepared by combining at least one dithiol of Formula (3) and at least one divinyl ether of Formula (4) followed by addition of an appropriate catalyst, and carrying out the reaction at a temperature, for example, within a range from 30° C. to 120° C., such as 70° C. to 90° C., for a duration, for example, within a range from 2 hours to 24 hours, such as 2 hours to 6 hours.

Thiol-terminated polythioether prepolymers may comprise a polyfunctional polythioether prepolymer, i.e., may have an average thiol functionality greater than 2.0. Suitable polyfunctional thiol-terminated polythioether prepolymers include, for example, those having the structure of Formula (2b):

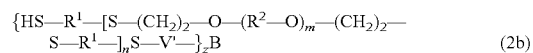

$$\{HS-R^1-[S-(CH_2)_2-O-(R^2-O)_m-(CH_2)_2-S-R^1-]_nS-V'-\}_zB \quad (2b)$$

wherein z has an average value of greater than 2.0, such as a value within a range from 2 and 3, a value within a range from 2 and 4, a value within a range from 3 and 6, or can be an integer from 3 to 6.

Polyfunctionalizing agents suitable for use in preparing such polyfunctional thiol-terminated prepolymers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed in U.S. Application Publication No. 2010/0010133, which is incorporated by reference in its entirety; and isocyanurates as disclosed, for example, in U.S. Application Publication No. 2011/0319559, which is incorporated by reference in its entirety. Other useful polyfunctionalizing agents include trimethylolpropane trivinyl ether, and the polythiols described in U.S. Pat. Nos. 4,366,307; 4,609,762; and 5,225,472, each of which is incorporated by reference in its entirety. Mixtures of polyfunctionalizing agents may also be used. As a result, polythioether prepolymers provided by the present disclosure may have a wide range of average functionality. For example, trifunctionalizing agents may afford average functionalities of groups capable of reacting with thiol groups from 2.05 to 3.0, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

Polythioether prepolymers provided by the present disclosure are liquid at room temperature and can have a glass transition temperature $T_g$, for example, less than −20° C., less than −30° C., or less than −40° C. The glass transition temperature $T_g$ can be determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

The polythioether prepolymers can exhibit a viscosity, for example from 20 poise to 500 poise (2 Pa-sec to 50 Ps-sec), from 20 poise to 200 poise (2 Pa-sec to 20 Pa-sec) or from 40 poise to 120 poise 4 Pa-sec to 12 Pa-sec), measured using a Brookfield CAP 2000 viscometer, with a No. 6 spindle, at speed of 300 rpm, and a temperature of 25° C.

Polythioether prepolymers provided by the present disclosure can be characterized by a number average molecular weight and/or a molecular weight distribution. Polythioether prepolymers can exhibit a number average molecular weight, for example, from 500 Daltons to 20,000 Daltons, from 2,000 Daltons to 5,000 Daltons, or from 1,000 Daltons to 4,000 Daltons. Polythioether prepolymers can exhibit a polydispersity (Mw/Mn; weight average molecular weight/number average molecular weight), for example, from 1 to 20, or from 1 to 5. The backbone of a polythioether prepolymer provided by the present disclosure can be modified to improve the properties such as adhesion, tensile strength, elongation, UV resistance, hardness, and/or flexibility of sealants and coatings prepared using polythioether prepolymers. For example, adhesion promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Application Publication No. 2015/0240122 (sulfone-containing), U.S. Pat. No. 8,952,124 (bis(sulfonyl)alkanol-containing), U.S. Application Publication No. 2015/0240140 (metal-ligand containing), and U.S. application Ser. No. 14/922,280 (antioxidant-containing) filed on Oct. 26, 2015, each of which is incorporated by reference in its entirety.

In addition to the thiol-terminated polythioether prepolymers of Formula (2a) and Formula (2b) other thiol-functional polythioethers and/or thiol-terminated sulfur-containing prepolymers may also be used in compositions provided by the present disclosure, either independently or in combination with the polythioether prepolymer s of Formula (2a) and Formula (2b). Examples of suitable thiol-functional polythioether prepolymer s include thiol-terminated sulfur-containing polyformal prepolymer s and thiol-terminated polysulfide prepolymers.

An additional sulfur-containing prepolymer can comprise a polythioether, a polysulfide prepolymer, a sulfur-containing polyformal prepolymer, or a combination of any of the foregoing. A sulfur-containing prepolymer can comprise a polythioether or a sulfur-containing prepolymer can comprise a polysulfide prepolymer. A sulfur-containing prepolymer may comprise a mixture of different polythioether prepolymer s and/or polysulfide prepolymer s, and the polythioether prepolymer s and/or polysulfide prepolymer s may have the same or different functionality. A sulfur-containing prepolymer can have an average functionality from 2 to 6, from 2 to 4, from 2 to 3, from 2.3 to 2.8, or from 2.05 to 2.5. For example, a sulfur-containing prepolymer can comprise a difunctional sulfur-containing prepolymer, a trifunctional sulfur-containing prepolymer, and a combination thereof. A sulfur-containing prepolymer can comprise a sulfur-containing polyformal.

A sulfur-containing prepolymer can be thiol-terminated. Examples of thiol-terminated polythioether prepolymer s are disclosed, for example, in U.S. Pat. No. 6,172,179. A thiol-terminated polythioether prepolymer can comprise Permapol® P3.1E, Permapol® L56086, or a combination thereof, each of which is available from PRC-DeSoto International Inc.

A thiol-terminated sulfur-containing prepolymer can comprise a thiol-terminated sulfur-containing polyformal. Sulfur-containing polyformal prepolymers useful in aerospace sealant applications are disclosed, for example, in U.S. Application Publication No. 2012/0234205 and in U.S. Application Publication No. 2012/0238707, each of which is incorporated by reference in its entirety.

A thiol-terminated sulfur-containing prepolymer can comprise a thiol-terminated polysulfide. As used herein, the term polysulfide refers to a prepolymer that contains one or more polysulfide linkages, i.e., —$S_x$— linkages, where x is from 2 to 4, in the prepolymer backbone and/or in pendant positions on the prepolymer chain. A polysulfide prepolymer can have two or more sulfur-sulfur linkages. Suitable polysulfides are commercially available, for example, from AkzoNobel and Toray Fine Chemicals under the names Thiokol-LP® and Thioplast®. Thioplast® products are available in a wide range of molecular weights ranging, for example, from less than 1,100 Daltons to over 8,000 Daltons, with molecular weight being the number average molecular weight in grams per mole. In some cases, the polysulfide has a number average molecular weight of 1,000 Daltons to 4,000 Daltons. The crosslink density of these products also varies, depending on the amount of crosslinking agent used. The —SH content, i.e., thiol or mercaptan content, of these products can also vary. The mercaptan content and molecular weight of the polysulfide can affect the cure speed of the prepolymer, with cure speed increasing with molecular weight.

Examples of suitable polysulfide prepolymers are disclosed, for example, in U.S. Pat. Nos. 4,623,711; 6,172,179; 6,509,418; 7,009,032; and 7,879,955, each of which is incorporated by reference in its entirety.

A sulfur-containing prepolymer can comprise a polysulfide selected from a Thiokol-LP® polysulfide, a Thioplast® polysulfide, and a combination thereof, such as Thioplast® G131, Thioplast® G21, and a combination thereof.

Compositions provided by the present disclosure can comprise a suitable curing agent. A curing agent can be selected to react with the terminal thiol group of a thiol-terminated sulfur-containing prepolymer provided by the present disclosure.

Compositions provided by the present disclosure can comprise a polyepoxide curing agent. A polyepoxide refers to a compound having two or more reactive epoxy groups. A polyepoxide may include a combination of polyepoxides. A polyepoxide can be liquid at room temperature.

Examples of suitable polyepoxide curing agents include, for example, polyepoxide resins such as hydantoin diepoxide, diglycidyl ether of bisphenol-A, diglycidyl ether of bisphenol-F, novolac type epoxies such as DEN™ 438 (novolac polyepoxide resin comprising the reaction product of epichlorohydrin and phenol-formaldehyde novolac) and DEN™ 431 (novolac polyepoxide resin comprising the reaction product of epichlorohydrin and phenol-formaldehyde novolac), available from Dow Chemical Co., certain epoxidized unsaturated, and combinations of any of the foregoing.

A polyepoxide curing agent can comprise a novolac polyepoxide resin such as DEN® 431, a bisphenol A/epichlorohydrin derived polyepoxide resin such as EPON® 828, or a combination thereof. A polyepoxide curing agent can comprise a combination of a novolac polyepoxide and a bisphenol A/epichlorohydrin derived polyepoxide. The weight ratio of novolac polyepoxide to bisphenol A/epichlorohydrin derived polyepoxide can be, for example, from 0.25:1 to 4:1, from 0.5:1 to 2:1, from 0.75:1 to 1.5:1, or 1:1.

Other examples of suitable polyepoxide curing agents include bisphenol A type polyepoxides, brominated bisphenol A type polyepoxides, bisphenol F type polyepoxides, biphenyl type polyepoxides, novolac type polyepoxides, an alicyclic polyepoxides, naphthalene type polyepoxides, ether series or polyether series polyepoxides, oxirane ring-containing polybutadienes, silicone polyepoxide copolymers, and a combination of any of the foregoing.

Additional examples of suitable polyepoxides include a bisphenol A type polyepoxide resin having a weight average molecular weight of 400 or less; a branched polyfunctional bisphenol A type polyepoxide r such as p-glycidyloxyphenyl dimethyltolylbisphenol A diglycidyl ether, a bisphenol F type polyepoxide; a phenol novolac type polyepoxide having a weight average molecular weight of 570 or less, an alicyclic polyepoxide such as vinyl(3,4-cyclohexene)dioxide, methyl 3,4-epoxycyclohexylcarboxylate (3,4-epoxycyclohexyl), bis(3,4-epoxy-6-methylcyclohexylmethyl) adipate and 2-(3,4-epoxycyclohexyl)-5,1-spiro(3,4-epoxycyclohexyl)-m-dioxane, a biphenyl type epoxy resin such as 3,3',5,5'-tetramethyl-4,4'-diglycidyloxybiphenyl; a glycidyl ester type epoxy resin such as diglycidyl hexahydrophthalate, diglycidyl 3-methylhexahydrophthalate and diglycidyl hexahydroterephthalate; a glycidylamine type polyepoxide resin such as diglycidylaniline, diglycidyltoluidine, triglycidyl-p-aminophenol, tetraglycidyl-m-xylene diamine, tetraglycidylbis(aminomethyl)cyclohexane; a hydantoin type polyepoxide resin such as 1,3-diglycidyl-5-methyl-5-ethylhydantoin; and a naphthalene ring-containing polyepoxide resin. Also, a polyepoxide resin having silicone such as 1,3-bis(3-glycidoxy-propyl)-1,1,3,3-tetramethyldisiloxane may be used. Other examples of suitable polyepoxides include (poly)ethylene glycol diglycidyl ether, (poly)propylene glycol diglycidyl ether, butanediol diglycidyl ether and neopentyl glycol diglycidyl ether; and triepoxides such as trimethylolpropane triglycidyl ether and glycerin triglycidyl ether.

Examples of commercially available polyepoxide resins suitable for use in compositions provided by the present disclosure include polyglycidyl derivatives of phenolic compounds, such as those available under the trade names EPON® 828, EPON® 1001, EPON® 1009, and EPON® 1031, from Resolution Performance Products LLC; and DER® 331, DER 332, DER® 334, and DER® 542 from Dow Chemical Co. Other suitable polyepoxide resins include polyepoxides prepared from polyols and the like and polyglycidyl derivatives of phenol-formaldehyde novolacs, the latter of which are commercially available under the trade names DEN® 431, DEN® 438, and DEN® 439 from Dow Chemical Company. Cresol analogs are also available commercially ECN® 1235, ECN® 1273, and ECN® 1299 from Ciba Specialty Chemicals, Inc. SU-8 is a bisphenol. A-type polyepoxide novolac available from Resolution Performance Products LLC. Polyglycidyl adducts of amines, aminoalcohols and polycarboxylic acids are also useful polyepoxides, including GLYAMINE® 135, GLYAMINE® 125, and GLYAMINE® 115 from F.I.C. Corporation; ARALDITE® MY-720, ARALDITE® MY-721, ARALDITE® 0500, and ARALDITE® 0510 from Ciba Specialty Chemicals.

A composition provided by the present disclosure can include, for example, from 1 wt % to 13 wt % of a polyepoxide, from 2 wt % to 12 wt %, from 3 wt % to 11 wt %, from 4 wt % to 10 wt %, from 5 wt % to 9 wt %, or from 6 wt % to 8 wt %, where wt % is based on the total weight of the composition.

Compositions provided by the present disclosure can comprise at least two pyridine catalysts. A pyridine catalyst can include, for example, a bipyridine, a combination of bipyridines, a dialkylaminopyridine, a combination of dialkylaminopyridines, or a combination of any of the foregoing.

A pyridine catalyst can include a combination of bipyridine catalysts. A pyridine catalyst comprise a bipyridine catalyst such as 4,4'-bipyridine, 4,3'-bipyridine, 4,2'-bipyridine, 3,3'-bipyridine, 3,2'-bipyridine, 2,2'-bipyridine, or a combination of any of the foregoing. Bipyridines such as 2,2'-bipyridine and 4,4'-bipyridine are suitable catalysts for the thiol-epoxy curing reaction.

As shown in the examples, the working time and the cure time of a thiol-epoxy sealant catalyzed by a pyridine can vary significantly depending on the pyridine catalyst or combination of pyridine catalysts. For example, at a temperature of 25° C., the working time of a thiol-epoxy sealant using 4,4'-bipyridine as the catalyst can be from 70 hours to 200 hours, and the cure time can be from 220 hours to 260 hours; and using 2,2'-bipyridine as the catalyst the working time of the same sealant except for the catalyst can be from 20 days to 30 days, and the cure time can be much longer.

Compositions provided by the present disclosure can comprise a combination of pyridine catalysts such as a combination of 2,2'-bipyridine and 4,4'-bipyridine. An objective of using a combination of pyridine catalysts is to provide curable compositions having a long working time and a short additional time to cure. This curing profile can be effectuated by using a combination of pyridine catalysts that include at least one pyridine catalyst that provides a slow curing rate and at least one second pyridine catalyst that provides a fast curing rate relative to the other pyridine catalyst, such as a combination of 2,2'-bipyridine which provides a slow thiol-epoxy cure and 4,4'-bipyridine which produces a fast thiol-epoxy cure. The two, slow curing and fast curing, bipyridine catalysts can be combined in a molar ratio (moles slow pyridine catalyst to moles fast pyridine catalyst), for example, from 1:1 to 3:1, from 1.4:1 to 2.7:1, from 1.7:1 to 2.4:1, or from 1.8:1 to 2.2:1.

Figure 2A:
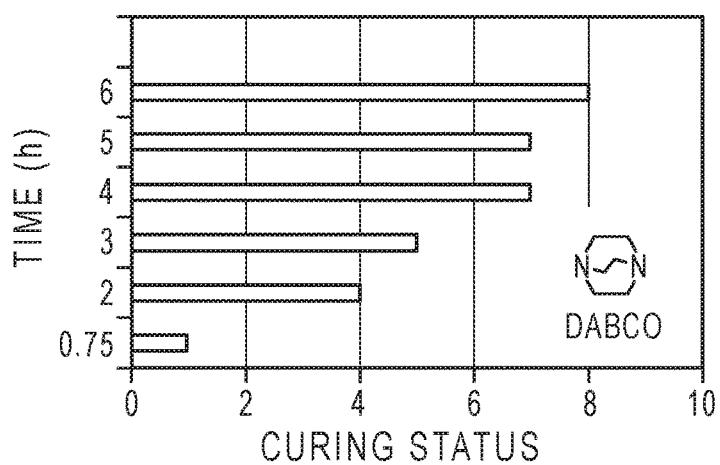
FIGS. 2A-2E show the curing status with time of polyepoxide-cured polythioether sealants using different amine catalysts.
Figure 2B:
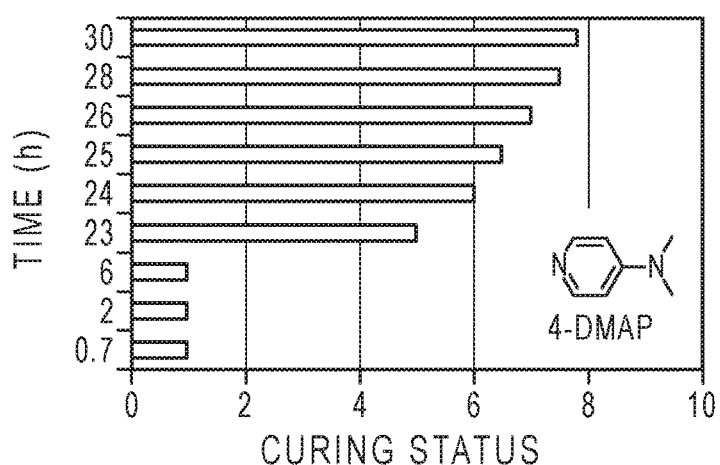
Figure 2C:
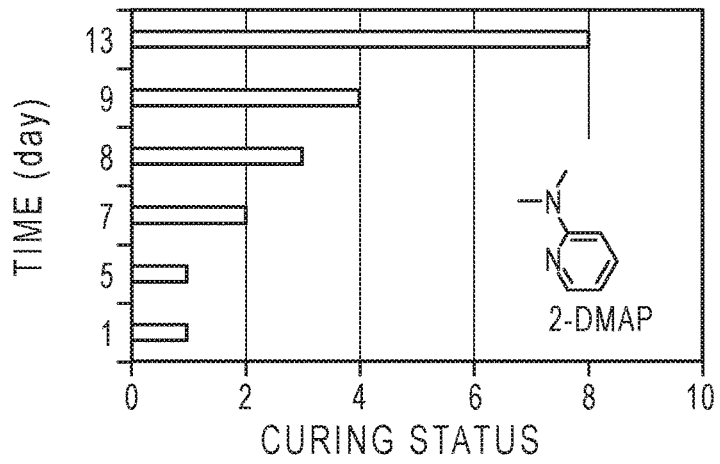
Figure 2D:
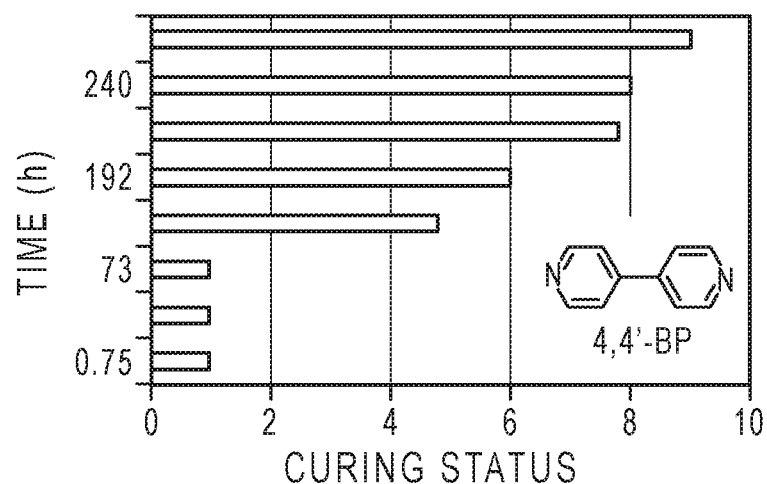
Figure 2E:
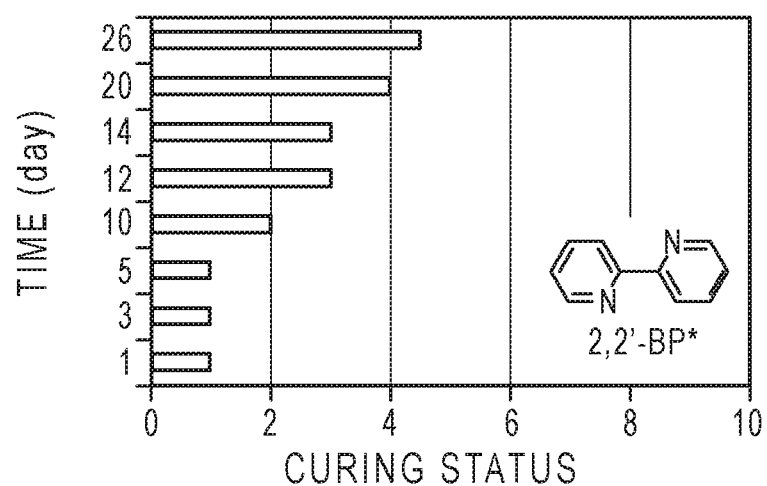

The terms slow and fast are used to express the relative difference in the curing rates for the same reaction when either the slow or fast pyridine catalyst is used alone. For example, referring to FIG. 2B and FIG. 2C, for the two pyridine catalysts 4-DMP and 2-DMP, 4-DMAP is a fast catalyst and 2-DMAP is a slow catalyst. Referring to FIG. 2D and FIG. 2E, for the two pyridine catalysts 4,4'-BP and 2,2'-BP, 4,4'-BP is a fast catalyst and 2,2'-BP is a slow catalyst.

Increasing the molar ratio of a slow bipyridine catalyst to a fast bipyridine catalyst generally can have more of an effect on the time to additional cure than on the working time. For example, increasing the molar ratio of a slow pyridine catalyst to a fast pyridine catalyst from 2:1 to 16:1 can increase the time to additional cure without significantly changing the working time.

A pyridine catalyst can comprise a dialkylaminopyridine having the structure of Formula (5):

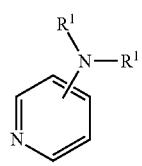

(5)

where each $R^1$ independently comprises $C_{1-4}$ alkyl.

In a dialkylaminopyridine of Formula (5) each $R^1$ can be methyl, ethyl, n-propyl, or isopropyl.

A dialkylaminopyridine of Formula (5) can comprise, for example, 2-dialkylaminopyridine, 3-dialkylaminopyridine, 4-dialkylaminopyridine, or a combination of any of the foregoing. A dialkylaminopyridine of Formula (5) can comprise 2-dimethylaminopyridine, 3-dimethylaminopyridine, or 4-dimethylaminopyridine. A dialkylaminopyridine of Formula (5) can comprise 2-diethylaminopyridine, 3-diethylaminopyridine, 4-diethylaminopyridine, and combinations of any of the foregoing.

In dialkylaminopyridines of Formula (5), 2-dimethylaminopyridine (2-DMAP) is an example of a slow pyridine catalyst, and 4-dimethylaminopyridine (4-DMAP) is an example of a fast catalyst for the thiol-epoxy reaction.

For example, a 4-DMAP-catalyzed thiol-epoxy sealant can exhibit a working time of from 10 hours to 20 hours and a cure time greater than 30 hours; and a 2-DMAP-catalyzed thiol-epoxy sealant can exhibit a working time of from 9 days to 13 days and a cure time greater than 10 days.

A pyridine catalyst can comprise a combination of 2-DMAP and 4-DMAP.

Compositions can comprise a combination of a slow curing 2-DMAP catalyst and a fast-curing 4,4'-bipyridine catalyst; or a combination of a slow curing 2,2'-bipyridine catalyst and a fast-curing 4-DMAP catalyst.

The amount of total pyridine catalyst in a composition can influence the working time and the cure time of a curable composition. For example, an increased amount of a slow pyridine catalyst can increase the cure time and the additional time to cure without substantially affecting the working time. A composition can comprise, for example, from 1 PHR to 3 PHR of at least two pyridine catalysts, from 1.2 PHR to 2.8 PHR, from 1.4 PHR to 2.6 PHR, from 1.6 PHR to 2.4 PHR, from 1.8 PHR to 2.2 PHR from 1 PHR to 2 PHR, from 1.2 PHR to 1.8 PHR or from 1.4 PHR to 1.6 PHR of at least two pyridine catalysts, where PHR refers to the parts by weight of the pyridine catalyst per 100 parts by weight of the thiol-terminated polythioether prepolymer in the composition. The combined pyridine catalyst can be a combination of 2-DMAP and 4-DMAP or a combination of 2-DMAP plus 2,2'-bipyridine and 4-DMAP plus 4,4'-bipyridine.

Thiol-epoxy compositions employing pyridine catalysts can exhibit a working time at a temperature of 25° C., for example, of more than 15 days, more than 12 days, more than 10 days, or more than 5 days. Thiol-epoxy compositions employing pyridine catalysts can exhibit a working time, for example, within a range from 10 days to 20 days, within a range from 12 days to 18 days, or within a range from 12 days to 15 days.

Thiol-epoxy compositions employing a combination of pyridine catalyst can exhibit a cure time, for example, of less than 20 days, less than 15 days, less than 12 days, or less than 10 days. Thiol-epoxy compositions employing pyridine catalysts can exhibit a cure time, for example, within a range from 5 days to 20 days, within a range from 7 days to 17 days, within a range from 9 days to 15 days, or within a range from 11 days to 13 days.

Thiol-epoxy compositions employing pyridine catalysts can exhibit a time to full cure, for example, of less than 40 days, less than 35 days, less than 30 days, or less than 25 days. Thiol-epoxy compositions employing pyridine catalysts can exhibit a time to full cure, for example, within a range from 20 days to 45 days, within a range from 25 days to 40 days, or within a range from 30 days to 40 days.

In selecting the combinations of working time and cure time, referring to FIG. 1 it will be appreciated that the cure time is longer than the working time.

Thiol-epoxy compositions provided by the present disclosure can comprise, for example, from 1.25 PHR to 1.75 PHR of a combination of 2,2'-bipyridine and 4,4'-bipyridine in a molar ratio from 1:1 to 3:1, from 1.5:1 to 2.5:1, from 1.75:1 to 2.25:1, or from 1.8:1 to 2.2:1. Thiol-epoxy compositions provided by the present disclosure can comprise, for example, from 1 PHR to 3 PHR of a combination of 2,2'-bipyridine and 4,4'-bipyridine in a molar ratio from 1:1 to 4:1.

A pyridine catalyst can comprise a combination of pyridine catalysts. A pyridine catalyst can comprise a combination of a first pyridine catalyst and a second pyridine catalyst. When using the first pyridine catalyst as the only catalyst in the composition, a composition comprising a thiol-terminated polythioether prepolymer and a polyepoxide can exhibit a working time that is longer than the working time of the composition when using the second pyridine catalyst as the only catalyst in the composition. When using the first pyridine catalyst as the only catalyst in the composition, a composition comprising a thiol-terminated sulfur-containing prepolymer and a polyepoxide can exhibit a working time that is more than twice, more than three times, more than four times, or more than five times the working time of the composition when using the second pyridine catalyst as the only catalyst in the composition.

For example, using the first pyridine catalyst only, the composition can exhibit a working time from 10 days (240 hours) to 30 days (720 hours), and when using the second pyridine catalyst as the only catalyst, the composition can exhibit a working time from 50 hours to 200 hours.

A combination of pyridine catalysts can comprise a combination of a slow pyridine catalyst and a fast pyridine catalyst. An example of a slow bipyridine catalyst is 2,2'- bipyridine and an example of a fast catalyst is 4,4'-bipyridine. An example of a slow dialkylaminopyridine catalyst is 2-dimethylaminopyridine and an example of a fast catalyst is 4-dimethylaminopyridine. Slow and fast are relative and refer to the relative reaction rate when one of the catalysts is used to catalyze a thiol-epoxy reaction provided by the present disclosure.

A composition comprising a thiol-terminated sulfur-containing prepolymer and a polyepoxide, when using only a slow pyridine catalyst such as 4-DMAP, can exhibit a working time, for example, within a range from 15 days to 40 days, within a range from 15 days to 30 days, or within a range from 17 days to 25 days.

A composition comprising a thiol-terminated sulfur-containing prepolymer and a polyepoxide, when using only a fast pyridine catalyst, such as 2-DMAP, can exhibit a working time, for example, within a range from 50 hours to 220 hours, within a range from 70 hours to 200 hours, or within a range from 100 hours to 150 hours.

A composition comprising a thiol-terminated sulfur-containing prepolymer and a polyepoxide, when using only a slow pyridine catalyst, such as 4,4'-BP, can exhibit a working time, for example, within a range from 7 days to 14 days, within a range from 8 days to 13 days, or within a range from 9 days to 12 days.

A composition comprising a thiol-terminated sulfur-containing prepolymer and a polyepoxide, when using only a fast pyridine catalyst, such as 2,2'-BP, can exhibit a working time, for example, within a range from 10 hours to 24 hours, within a range from 12 hours to 22 hours, or within a range from 14 hours to 20 hours.

When a combination of slow and fast pyridine catalysts are used, a composition comprising a thiol-terminated sulfur-containing prepolymer and a polyepoxide can exhibit a working time, for example, within a range from 8 days to 18 days, within a range from 10 days to 16 days, or within a range from 11 days to 15 days.

When a combination of slow and fast pyridine catalysts are used, a composition comprising a thiol-terminated sulfur-containing prepolymer and a polyepoxide can exhibit a cure time, for example, within a range from 8 days to 24 days, within a range from 10 days to 22 days, or within a range from 12 days to 20 days.

When a combination of slow and fast pyridine catalysts are used, a composition comprising a thiol-terminated sulfur-containing prepolymer and a polyepoxide can exhibit a working time, for example, within a range from 8 days to 18 days, within a range from 10 days to 16 days, or within a range from 11 days to 15 days; and a cure time, for example, within a range from 8 days to 24 days, within a range from 10 days to 22 days, or within a range from 12 days to 20 days.

When a combination of slow and fast pyridine catalysts are used, a composition comprising a thiol-terminated sulfur-containing prepolymer and a polyepoxide can exhibit a cure time, for example, within a range from 15 days to 40 days, within a range from 20 days to 35 days, within a range from 25 days to 30 days.

When a combination of slow and fast pyridine catalysts are used, a composition comprising a thiol-terminated sulfur-containing prepolymer and a polyepoxide can exhibit a working time, for example, within a range from 8 days to 18 days, within a range from 10 days to 16 days, or within a range from 11 days to 15 days; an additional time to cure, for example, within a range from 8 days to 24 days, within a range from 10 days to 22 days, or within a range from 12 days to 20 days; and a time to hardness 30 Shore A (cure time), for example, within a range from 15 days to 40 days, within a range from 20 days to 35 days, within a range from 25 days to 30 days.

It is an objective of the present invention that a combination of pyridine catalysts that cure a thiol-epoxy reaction at different rates can provide a composition that has a long working time and a short additional cure time.

A composition can comprise, for example, from 0.25 PHR to 5 PHR of a combination of slow pyridine catalyst and fast pyridine catalysts, from 0.5 PHR to 4 PHR, from 0.75 PHR to 3 PHR, from 1 PHR to 1.75 PHR, or from 1 PHR to 1.5 PHR of a combination of slow and fast pyridine catalysts.

A composition can comprise, for example, a molar ratio of slow to fast pyridine catalysts, for example, the molar ratio of slow pyridine catalyst to fast pyridine catalyst can be from 1:1 to 20:1, from 2:1 to 18:1, from 4:1 to 16:1, from 6:1 to 10:1, from 1:1 to 4:1, from 1.5:1 to 3:1, or from 1.5:1 to 2:1.

A composition can comprise, for example, from 0.25 PHR to 5 PHR of a combination of slow pyridine catalyst and fast pyridine catalyst, from 0.5 PHR to 4 PHR, from 0.75 PHR to 3 PHR, from 1 PHR to 1.75 PHR, or from 1 PHR to 1.5 PHR of a combination of slow and fast pyridine catalysts; and the ratio of slow pyridine catalyst to fast pyridine catalyst can be, for example, from 1:1 to 20:1, from 2:1 to 18:1, from 4:1 to 16:1, from 6:1 to 10:1, from 1:1 to 4:1, from 1.5:1 to 3:1, or from 1.5:1 to 2:1.

A composition can comprise a first pyridine catalyst that when used as the only catalyst in the compositions provides a working time, for example, longer than 12 days, longer than 13 days, longer than 14 days, longer than 15 days, or longer than 16 days; and a second pyridine catalyst that when used as the only catalyst in the composition provides a working time, for example, less than 12 days, less than 13 days, less than 14 days, less than 15 days, or less than 16 days.

A composition can comprise a first pyridine catalyst that when used as the only catalyst in the compositions provides a working time, for example, longer than 8 days, longer than 9 days, longer than 10 days, longer than 11 days or longer than 12 days; and a second pyridine catalyst that when used as the only catalyst in the composition provides a working time, for example, less than 8 days, less than 9 days, less than 10 days, less than 11 days, or less than 12 days.

A composition can comprise a first pyridine catalyst that when used as the only catalyst in the compositions provides a working time, for example, longer than 16 days, longer than 17 days, longer than 18 days, longer than 19 days, or longer than 20 days; and a second pyridine catalyst that when used as the only catalyst in the composition provides a working time, for example, less than 16 days, less than 17 days, less than 18 days, less than 19 days, or less than 20 days.

A composition can comprise a first pyridine catalyst comprising 2,2'-bipyridine, 2-dimethylaminopyridine (2-DMAP), or a combination thereof; and a second pyridine catalyst comprising 4,4'-bipyridine, 4-dimethylaminopyridine (4-DMAP), or a combination thereof.

A composition can comprise a first pyridine catalyst that when used as the only catalyst in the compositions provides an additional time to cure greater than 12 days; and a second pyridine catalyst that when used as the only catalyst in the composition provides an additional time to cure less than 12 days.

A composition can comprise a first pyridine catalyst that when used as the only catalyst in the compositions provides an additional time to cure greater than 8 days; and a second pyridine catalyst that when used as the only catalyst in the composition provides an additional time to cure less than 8 days.

A composition can comprise a first pyridine catalyst that when used as the only catalyst in the compositions provides an additional time to cure greater than 16 days; and a second pyridine catalyst that when used as the only catalyst in the composition provides an additional time to cure less than 16 days.

A composition can comprise a first pyridine catalyst comprising 2,2'-bipyridine, 2-dimethylaminopyridine (2-DMAP), or a combination thereof; and a second pyridine catalyst comprising 4,4'-bipyridine, 4-dimethylaminopyridine (4-DMAP), or a combination thereof.

A first pyridine catalyst can comprise 2,2'-bipyridine and a second pyridine catalyst can comprise 4,4'-bipyridine.

A first pyridine catalyst can comprise 2-dimethylaminopyridine (2-DMAP) and a second pyridine catalyst can comprise 4-dimethylaminopyridine (4-DMAP).

A composition can comprise a first pyridine catalyst, wherein the first pyridine, when used as the only catalyst in the composition exhibits a first cure time (time to hardness 30 Shore A); and a second pyridine catalyst, wherein the first pyridine, when used as the only catalyst in the composition exhibits a second cure time, wherein the second cure time is at least twice as long as the first cure time, at least 1.5 times as long as the first cure time, or at least three times as long as the first cure time.

In addition to at least two pyridine catalysts, compositions provided by the present disclosure can comprise one or more additional catalysts for the thiol-epoxy reaction. The one or more additional catalysts can include an amine catalyst (other than a pyridine catalyst), latent amine catalysts, or combinations thereof.

A latent amine catalyst refers to an amine catalyst that is slowly released or diffuses from a barrier at room temperature. The release or diffusion of the amine catalyst may be accelerated, for example at increased temperature, radiation, or force; however, at room temperature the time for release provides for an extended working time of the composition. Thus, a composition containing a latent amine catalyst provides for a long shelf life and when mixed with reactants such as a thiol-terminated polythioether and a polyepoxide, provides for an extended working time and a fast additional time to cure. A latent amine catalyst does not necessarily require activation such as by exposure to elevated temperature to release the catalyst.

A suitable amine catalyst for use in compositions of the present disclosure is capable of catalyzing the reaction between thiol groups and epoxy groups. An amine catalyst can comprise an amine catalyst such as, for example, N,N-dimethylethanolamine, triethylene diamine (TEDA), bis(2-dimethylaminoethyl)ether (BDMAE), N-ethylmorpholine, N',N'-dimethylpiperazine, N,N,N',N',N'-pentamethyl-diethylene-triamine (PMDETA), N,N-dimethylcyclohexylamine (DMCHA), N,N-dimethylbenzylamine (DMBA), N,N-dimethylcethylamine, N,N,N'N'',N''-pentamethyl-dipropylene-triamine (PMDPTA), triethylamine, 1-(2-hydroxypropyl)imidazole, 1,4-diazabicyclo[2.2.2]octane (DABCO®) and 2,4,6-tris(dimethylaminomethyl)phenol, as contained in the accelerant composition DMP-30®, available from Sigma-Aldrich, dimethylethanolamine (DMEA), bis-(2-dimethylaminoethyl)ether, N-ethylmorpholine, triethylamine, 1,8-diazabicyclo[5.4.0]undecene-7 (DBU), benzyldimethylamine (BDMA), N,N,N'-trimethyl-N'-hydroxyethyl-bis(aminoethyl)ether, N'-(3-(dimethylamino) propyl)-N,N-dimethyl-1,3-propanediamine, or a combination of any of the foregoing.

An amine catalyst can comprise an imidazole catalyst.

Examples of suitable imidazole catalysts include imidazole, 2-methylimidazole, 2-ethylimidazole, 2-isopropylimidazole, 2-undecylimidazole, 2-dodecylimidazole, 2-phenylimidazole, 2-ethyl-4-methyl-imidazole, 2-benzylimidazole, 2,4,5-trimethylimidazole, and a combination of any of the foregoing.

Other examples of suitable imidazoles include alkyl-substituted imidazoles such as 2-methyl imidazole, 2-ethyl-4-methylimidazole, 2,4-dimethylimidazole, butylimidazole, 2-heptadecenyl-4-methylimidazole, 2-undecenylimidazole, 1-vinyl-2-methylimidazole, 2-n-heptadecylimidazole, 2-undecylimidazole, 2-heptadecylimidazole, 1-benzyl-2-methylimidazole, 1-propyl-2-methylimidazole, 1-cyanoethyl-2-methylimidazole, 1-cyanoethyl-1-cyanoethyl-2-undecylimidazole, 1-cyanoethyl-2-phenylimidazole, 1-guanaminoethyl-2-methylimidazole, addition products of an imidazole and trimellitic acid, 2-n-heptadecyl-4-methylimidazole; and aryl-substituted imidazoles such as phenylimidazole, benzylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-tert-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethylaminophenyl)-4,5-diphenylimidazole, 2-(2-hydroxyphenyl)-4,5-diphenylimidazole, di(4,5-diphenyl-2-imidazole)-benzene-1,4,2-naphthyl-4,5-diphenylimidazole, 1-benzyl-2-methylimidazole, 2-p-methoxystyrylimidazole, and a combination of any of the foregoing.

An imidazole catalyst can comprise an imidazole-epoxy adduct. An imidazole-epoxy adduct can be obtained by reacting an imidazole compound with an epoxy compound. An imidazole compound can be, for example, any of those disclosed herein. Examples, of suitable epoxides for forming an imidazole-epoxy adduct include 1,2-epoxybutane, 1,2-epoxyhexane, 1,2-epoxyoctane, styrene oxide, n-butyl glycidyl ether, hexyl glycidyl ether, phenyl glycidyl ether, glycidyl acetate, glycidyl butyrate, glycidyl hexanoate, and glycidyl benzoate. Examples of suitable imidazole-epoxy adducts formed by the addition of an imidazole compound to an epoxide include, for example, Novacure® HX-3722 (an encapsulated imidazole/bisphenol A polyepoxide adduct dispersed in bisphenol A polyepoxide) and Novacure® HX-3921 HP, both available from Asahi Ciba.

A latent amine catalyst can comprise a shell surrounding a core containing an amine catalyst.

Examples of suitable latent amine catalysts include Technicure® LC-80 and Technicure® 101 (available from A&C Catalyst), and EID-8519-01, an encapsulated DBU catalyst available from Salvona Technologies, LLC.

A latent amine catalyst can be an inclusion catalyst in which an amine catalyst is incorporated within an inclusion complex. Examples of suitable inclusion catalysts include those provided by Nippon Soda Co., Ltd. These inclusion catalysts comprise an inclusion complex wherein an amine catalyst can be complexed with a host molecule by means of crystallization. In such an inclusion catalyst an active molecule such as an imidazole retained by may be host molecules to form an inclusion complex. Upon exposure to heat, the inclusion complex can dissociate to release the guest imidazole molecule. An inclusion complex can contain an imidazole amine catalyst such as 2-methylimidazole, 2-ethyl-4-1H-methylimidazole, (4-methyl-2-phenyl-1H- imidazol-5-yl)methanol, and 1-(2-cyanoethyl)-2-ethyl-4-methylimidazole. An example of an imidazole inclusion catalyst is Nissocure™ TIC-188 available from Nisso America, Inc.

Compositions provided by the present disclosure may comprise one or more additional components suitable for use in aerospace sealants and the selection can depend at least in part on the desired performance characteristics of the cured sealant under conditions of use.

Compositions provided by the present disclosure can comprise one or more than one adhesion promoter. An adhesion promoter may be present in amount from 0.1 wt % to 15 wt % of a composition, or less than 5 wt %, less than 2 wt %, or less than 1 wt %, based on the total dry weight of the composition. Examples of suitable adhesion promoters include phenolic resins, such as Methylon® phenolic resin, and organosilanes, such as epoxy, mercapto or amino functional silanes, such as Silquest® A-187 and Silquest® A-1100, available from Momentive Performance Materials. Other useful adhesion promoters are known in the art. The adhesion promoter can include phenolic resins such as T-1601, available from PRC-DeSoto International.

Compositions provided by the present disclosure may comprise one or more different types of filler. Suitable fillers include inorganic fillers, such as carbon black and calcium carbonate ($CaCO_3$), silica, polymer powders, and lightweight fillers. Suitable lightweight fillers include, for example, those described in U.S. Pat. No. 6,525,168. A composition can comprise from 5 wt % to 60 wt % of the filler or combination of fillers, from 10 wt % to 50 wt %, or from 20 wt % to 40 wt %, based on the total weight of the composition. Suitable lightweight fillers can have a specific gravity less than 1, less than 0.8, less than 0.6, less than 0.4, less than 0.2, less than 0.1, or less than 0.05. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and/or catalyst.

Compositions provided by the present disclosure can include low density filler particles. As used herein, low density, when used with reference to such particles means that the particles have a specific gravity of no more than 0.7, no more than 0.25, or no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 microns to 100 microns and a specific gravity of 0.25 (Eccospheres®). Other examples include alumina/silica microspheres having particle sizes in the range of 5 microns to 300 microns (measured using laser diffraction) and a specific gravity of 0.7 (Fillite®), aluminum silicate microspheres having a specific gravity of from 0.45 to 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of 40 µm and a density of 0.135 g/cc. Suitable fillers for decreasing the specific gravity of the composition include, for example, hollow microspheres such as Expancel® microspheres (available from AkzoNobel) or Dualite® low density polymer microspheres (available from Henkel). Compositions provided by the present disclosure can include lightweight filler particles comprising an exterior surface coated with a thin coating, such as those described in U.S. Application Publication No. 2010/0041839, which is incorporated by reference in its entirety.

A low density filler can comprise less than 2 wt % of a composition, less than 1.5 wt %, less than 1.0 wt %, less than 0.8 wt %, less than 0.75 wt %, less than 0.7 wt % or less than 0.5 wt % of a composition, where wt % is based on the total dry solids weight of the composition.

Compositions provided by the present disclosure can comprise at least one filler that is effective in reducing the specific gravity of the composition. The specific gravity of a composition can be from 0.8 to 1, from 0.7 to 0.9, from 0.75 to 0.85, or 0.8. The specific gravity of a composition can be less than 0.9, less than 0.8, less than 0.75, less than 0.7, less than 0.65, less than 0.6, or less than 0.55.

A composition may also include any number of additives as desired. Examples of suitable additives include plasticizers, pigments, surfactants, adhesion promoters, thixotropic agents, fire retardants, masking agents, and combinations of any of the foregoing. When used, the additives may be present in a composition in an amount ranging, for example, from 0 wt % to 60 wt %. Additives may be present in a composition in an amount ranging from 25 wt % to 60 wt %, where wt % is based on the total weight of the composition.

Compositions provided by the present disclosure may include an additional thiol-terminated sulfur-containing prepolymer such as, for example, a thiol-terminated polysulfide or a thiol-terminated sulfur-containing polyformal.

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquids and gases. A coating can comprise a covering that is applied to the surface of a substrate to, for example, improve the properties of the substrate such as the appearance, adhesion, wettability, corrosion resistance, wear resistance, fuel resistance, and/or abrasion resistance. A sealant can be used to seal surfaces, smooth surfaces, fill gaps, seal joints, seal apertures, and other features. A potting composition can comprise a material useful in an electronic assembly to provide resistance to shock and vibration and to exclude moisture and corrosive agents. Sealant compositions provided by the present disclosure are useful, e.g., as aerospace sealants and as linings for fuel tanks.

Compositions containing thiol-terminated polythioether prepolymers, polyepoxide curing agents, and pyridine catalysts can be formulated as sealants.

Compositions, such as sealants, may be provided as multi-part compositions, such as two-part compositions, wherein one part comprises one or more thiol-terminated polythioether prepolymers and one or more pyridine catalysts and a second part comprises one or more polyepoxide curing agents. Additives and/or other materials may be added to either part as desired or necessary. The two parts may be combined and mixed prior to use.

A first part can comprise, for example, from 40 wt % to 80 wt % of a thiol-terminated polythioether prepolymer, from 45 wt % to 75 wt %, from 50 wt % to 70 wt %, or from 55 wt % to 65 wt % of a thiol-terminated polythioether prepolymer, where wt % is based on the total weight of the first part.

A first part can comprise from 0.1 wt % to 1.1 wt % of a pyridine catalyst, from 0.2 wt % to 1.0 wt %, from 0.3 wt % to 0.9 wt %, from 0.4 wt % to 0.8 wt %, or from 0.5 wt % to 0.7 wt % of a pyridine catalyst, where wt % is based on the total weight of the first part.

A first part can comprise, for example, from 40 wt % to 80 wt % of a thiol-terminated polythioether prepolymer and from 0.1 wt % to 1.1 wt % of a pyridine catalyst, where wt % is based on the total weight of the first part. A first part can comprise, for example, from 45 wt % to 75 wt % of a thiol-terminated polythioether prepolymer and from 0.3 wt % to 0.9 wt % of a pyridine catalyst, where wt % is based on the total weight of the first part. A first part can comprise, for example, from 55 wt % to 65 wt % of a thiol-terminated polythioether prepolymer and from 0.5 wt % to 0.7 wt % of a pyridine catalyst, where wt % is based on the total weight of the first part.

A second part can comprise, for example, from 30 wt % to 60 wt % of a polyepoxide, from 35 wt % to 55 wt %, from 40 wt % to 50 wt %, or from 42 wt % to 48 wt % of a polyepoxide, where wt % is based on the total weight of the second part.

A second part can comprise, for example, from 2 wt % to 15 wt % of a polyepoxide, from 4 wt % to 13 wt %, from 6 wt % to 11 wt %, or from 7 wt % to 10 wt % of a polyepoxide, where wt % is based on the total weight of the composition.

A sealant composition may contain from 30 wt % to 70 wt % of a thiol-terminated polythioether prepolymer, from 35 wt % to 65 wt %, from 40 wt % to 60 wt %, or from 45 wt % to 55 wt % of a thiol-terminated polythioether prepolymer, where wt % is based on the total weight of the sealant composition. A sealant composition can contain from 2 wt % to 12 wt % of an polyepoxide, from 3 wt % to 11 wt %, from 4 wt % to 10 wt %, or from 5 wt % to 9 wt % of an polyepoxide, where wt % is based on the total weight of the sealant composition.

A sealant composition can comprise less than 3 wt % of a pyridine catalyst, less than 2 wt %, or less than 1 wt % of a pyridine catalyst, where wt % is based on the total weight of the sealant composition. For example, a sealant composition can comprise from 0.1 wt % to 5 wt %, from 0.2 wt % to 4 wt %, from 0.5 wt % to 3 wt %, or from 1 wt % to 3 wt % of a pyridine catalyst or combination of pyridine catalysts, where wt % is based on the total weight of the sealant composition. For example, a sealant composition can comprise from 0.1 wt % to 1 wt %, from 0.1 wt % to 0.8 wt %, from 0.2 wt % to 0.8 wt %, or from 0.2 wt % to 0.7 wt % of a pyridine catalyst or combination of pyridine catalysts, where wt % is based on the total weight of the sealant composition.

A sealant composition can comprise, for example, from 15 wt % to 60 wt % of a filler or combination of fillers, from 20 wt % to 55 wt %, from 25 wt % to 50 wt %, or from 30 wt % to 40 wt % of a filler or combination of fillers, where wt % is based on the total weight of the sealant composition.

A sealant composition may contain from 30 wt % to 70 wt % of a thiol-terminated polythioether prepolymer, from 2 wt % to 12 wt % of an polyepoxide, and from 0.1 wt % to 1 wt % of a pyridine catalyst, where wt % is based on the total weight of the sealant composition. A sealant composition may contain from 30% to 70 wt % of a thiol-terminated polythioether prepolymer, from 2 wt % to 12 wt % of an polyepoxide, from 0.1 wt % to 1 wt % of a pyridine catalyst, and from 15 wt % to 60 wt % of a filler or combination of fillers, where wt % is based on the total weight of the sealant composition.

A sealant composition may contain from 35 wt % to 65 wt % of a thiol-terminated polythioether prepolymer, from 3 wt % to 11 wt % of an polyepoxide, and from 0.1 wt % to 0.8 wt % of a pyridine catalyst, where wt % is based on the total weight of the sealant composition. A sealant composition may contain from 35 wt % to 65 wt % of a thiol-terminated polythioether prepolymer, from 3 wt % to 11 wt % of an polyepoxide, from 0.1 wt % to 0.8 wt % of a pyridine catalyst, and from 20 wt % to 55 wt % of a filler or combination of fillers, where wt % is based on the total weight of the sealant composition.

A sealant composition may contain from 45 wt % to 55 wt % of a thiol-terminated polythioether prepolymer, from 5 wt % to 9 wt % of an polyepoxide, and from 0.2 wt % to 0.7 wt % of a pyridine catalyst, where wt % is based on the total weight of the sealant composition. A sealant composition may contain from 45 wt % to 55 wt % of a thiol-terminated polythioether prepolymer, from 5 wt % to 9 wt % of an polyepoxide, from 0.2 wt % to 0.7 wt % of a pyridine catalyst, and from 30 wt % to 40 wt % of a filler or combination of fillers, where wt % is based on the total weight of the sealant composition.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; polyepoxide; urethane; graphite; fiberglass composite; aramid fibers, yarns and products made thereof, available e.g. as Kevlar®; acrylics; and polycarbonates. Compositions provided by the present disclosure may be applied to an existing coating on a substrate, such as a polyurethane coating.

Sealant compositions provided by the present disclosure may be formulated as Class A, Class B, or Class C sealants. A Class A sealant refers to a brushable sealant having a viscosity of 1 poise to 500 poise (0.1 Pa-sec to 50 Pa-sec) and is designed for brush application. A Class B sealant refers to an extrudable sealant having a viscosity from 4,500 poise to 20,000 poise (450 Pa-sec to 2,000 Pa-sec) and is designed for application by extrusion via a pneumatic gun. A Class B sealant can be sued to form fillets and sealing on vertical surfaces or edges where low slump/slag is required. A Class C sealant has a viscosity from 500 poise to 4,500 poise (50 Pa-sec to 450 Pa-sec) and is designed for application by a roller or combed tooth spreader. A Class C sealant can be used for fay surface sealing. Viscosity can be measured according to Section 5.3 of SAE Aerospace Standard AS5127/1C published by SAE International Group.

Furthermore, methods are provided for sealing an aperture utilizing a composition provided by the present disclosure. These methods comprise, for example, applying a curable composition provided by the present disclosure to at least one surface of a part; and curing the applied composition to provide a sealed part.

As will also be appreciated, the methods may be used to seal apertures on aerospace vehicles including aircraft and aerospace vehicles. Methods are provided for sealing an aperture utilizing a composition provided by the present disclosure. These methods comprise, for example, applying a composition provided by the present disclosure to a surface to seal an aperture, and curing the composition. A method for sealing an aperture can comprise applying a sealant composition provided by the present disclosure to surfaces defining an aperture and curing the sealant, to provide a sealed aperture.

A composition provided by the present disclosure may be cured at a temperature from 20° C. to 25° C. A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, i.e., 25° C.

Compositions provided by the present disclosure may be applied directly onto the surface of a substrate or over an underlayer by any suitable coating process.

When cured at room temperature, a sealant provided by the present disclosure can cure to a tack free surface within 150 hours to 350 hours after the sealant components are mixed, within 170 hours to 330 hours, within 190 hours to 310 hours, or within 210 hours to 300 hours after the sealant composition is combined and mixed. When cured at a temperature of 25° C. a sealant provided by the present disclosure can cure to a hardness of at least 20 Shore A within 20 days to 50 days, within 25 days to 45 days, within about 30 days to 40 days after the components of the sealant composition are first combined and mixed.

Compositions provided by the present disclosure can cure rapidly at the end of the working time. For example, a sealant can cure, at room temperature, to hardness 30 Shore A within 5 days after the time the sealant is no longer workable (end of working time), within 10 days, within 15 days, within 20 days or within 25 days after the end of the working time.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength (measured according to AMS 3281, Paragraph 3.6.24) develops from 2 days to 3 days, following mixing and application to a surface. In general, full adhesion strength as well as other properties of cured compositions of the present disclosure becomes fully developed within 7 days following mixing and application of a curable composition to a surface.

Sealants provided by the present disclosure can be used to seal surfaces and substrates, for example, of aviation and aerospace vehicles. The sealants may be used to seal apertures such as apertures associated with fuel tanks. To seal an aperture a sealant may be applied to a surface or one or more surfaces defining an aperture and the sealant allowed to cure to seal the aperture.

For aerospace sealant applications it can be desirable that a sealant meet the requirements of Mil-S-22473E (Sealant Grade C) at a cured thickness of 20 mils (0.058 mm), exhibit an elongation greater than 200%, a tensile strength greater than 250 psi (1.72 MPa), and excellent fuel resistance, and maintain these properties over a wide temperature range from −67° F. to 360° F. (−55° C. to 182° C.). In general, the visual appearance of the sealant is not an important attribute.

Cured compositions disclosed herein, such as cured sealants, exhibit properties acceptable for use in aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in Jet Reference Fluid (JRF) Type I for 7 days, and following immersion in a solution of 3% NaCl according to AMS 3265B test specifications; tensile strength between 300 pounds per square inch (psi) (2.07 MPa) and 400 psi (2.758 MPa); tear strength greater than 50 pounds per linear inch (pli) (8.76 N/mm); elongation between 250% and 300%; and hardness greater than 40 Durometer A. These and other cured sealant properties appropriate for aviation and aerospace applications are disclosed in AMS 3265B, the entirety of which is incorporated by reference. It is also desirable that, when cured, compositions of the present disclosure used in aviation and aircraft applications exhibit a percent volume swell not greater than 25% following immersion for one week at 60° C. (140° F.) and ambient pressure in JRF Type I. Other properties, ranges, and/or thresholds may be appropriate for other sealant applications.

Therefore, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). JRF Type I, as employed for determination of fuel resistance, has the following composition: toluene: 28%±1% by volume; cyclohexane (technical): 34%±1% by volume; isooctane: 38%±1% by volume; and tertiary dibutyl disulfide: 1.000%±0.005% by volume (see AMS 2629, issued Jul. 1, 1989, § 3.1.1 etc., available from SAE (Society of Automotive Engineers)).

Compositions provided by the present disclosure provide a cured product, such as a sealant, that can exhibit a tensile elongation of at least 100% and a tensile strength of at least 400 psi (2.76 MPa) when measured in accordance with the procedure described in AMS 3279, § 3.3.17.1, test procedure AS5127/1, § 7.7.

Cured sealants provided by the present disclosure can meet the performance criteria of SAE AS5127/1B, which includes properties such as fuel swell, weight loss, hardness, tensile strength, elongation, peel strength, and lap shear strength.

A cured sealant comprising a composition provided by the present disclosure can meet or exceed the requirements for aerospace sealants as set forth in AMS 3277.

Apertures and surfaces, including apertures and surfaces of aerospace vehicles, sealed with compositions provided by the present disclosure are also disclosed.

EXAMPLES

Embodiments provided by the present disclosure are further illustrated by reference to the following examples, which describe compositions, cured sealants, and methods provided by the present disclosure. It will be apparent to those skilled in the art that many modifications, both to materials, and to methods, may be practiced without departing from the scope of the disclosure.

Example 1

Thiol-Epoxy Curing Using Various Amine Catalysts

The curing rate of thiol-epoxy sealant compositions using various amine catalysts was evaluated.

Sealant formulations consisted of two parts, a base and an accelerator. The components for the base formulation are listed in Table 1 and for the accelerator formulation in Table 2.

TABLE 1

Base Formulation.

| Component | Weight, g |
| --- | --- |
| Adhesion Promoter* | 0.97 |
| Silica | 1.46 |
| Calcium carbonate | 53.5 |
| Aluminum hydroxide | 9.73 |
| Tetra N-butyl titanate | 0.49 |
| Titanium dioxide | 0.97 |
| Phenolic resin | 1.46 |
| Permapol ® 3.1E prepolymer** | 107 |
| Silane | 0.2 |
| Tung oil | 1.41 |
| Amine Catalyst | 1.05 |

*Adhesion promoter T-1601; available from PRC-DeSoto International, Inc.
**Permapol ® 3.1E prepolymer; thiol-terminated polythioether available from PRC-DeSoto International, Inc.

TABLE 2

Accelerator Formulation.

| Component | Weight, g |
| --- | --- |
| Adhesion Promoter* | 5.7 |
| Calcium carbonate | 50.4 |
| Plasticizer | 40 |
| Carbon black | 24 |
| Polyepoxide Resin, DEN ® 431 | 50 |
| Polyepoxide Resin, EPON ® 828 | 50 |

*Adhesion promoter T-1601; available from PRC-DeSoto International, Inc.

Sealant compositions were prepared using one of the following amine catalysts: DABCO® 33-LV, 4-DMAP, 2-DMAP, 4,4'-bipyridine, or 2,2'-bipyridine. The base and the accelerator were separately mixed and the mixtures maintained at room temperature for 24 hours before the base and the accelerator were combined.

A sealant was prepared by mixing 100 g of the base with 18.5 g of the accelerator.

The base and accelerator were thoroughly mixed, the mixture poured into a curing pan, and the sealant allowed to cure at room temperature. The status of the sealant cure using each of the catalysts was monitored periodically and classified as shown in FIGS. 2A-2E according to the scale listed in Table 3.

TABLE 3

Curing Status Classification.

| Scale | Curing Status |
| --- | --- |
| 1 | Freshly mixed sealant |
| 2 | Slightly more viscous than the freshly mixed sealant |
| 3 | Noticeably more viscous than the freshly mixed sealant |
| 4 | Slight gelling, but the sealant is movable and spreadable (workable) |
| 5 | Gelled and not spreadable (not workable) |
| 6 | Slightly more gelled |
| 7 | Almost cured, but not tack-free |
| 8 | Tack-free |
| 9 | hardness 20 Shore A |
| 10 | hardness 30 Shore A |

A portion of the mixed sealant incorporating the 4,4'-bipyridine catalyst was spread into a ⅛-inch thick film and left to cure at room temperature until fully cured. One-inch specimens were then prepared for tensile/elongation testing using a tensile die. The tensile strength was 523 psi and the elongation was 596% determined according to ASTM D-412.

Samples prepared from the cured ⅛-inch-thick (0.3175 cm-thick) film incorporating the 4,4'-bipyridine catalyst were immersed in JRF Type I for 7 days at 140° F. (60° C.). After exposure to JRF Type I, the tensile strength was 256 psi (1.765 MPa) and the elongation was 524%.

Samples prepared from the cured ⅛-inch-thick (0.3175 cm-thick) film using the 4,4'-bipyridine catalyst were also tested for swell and weight loss following exposure to JRF Type I. Samples were weighed in air and in water and then immersed in JRF Type I for 7 days at 140° F. (60° C.). After exposure to JRF Type I the samples were reweighed, dried for 24 hours at 120° F. (49° C.) and reweighed. The percent swell was 17% and the weight loss was 4%.

Example 2

Effect of Bi(Pyridine) Catalyst PHR

Figure 3:
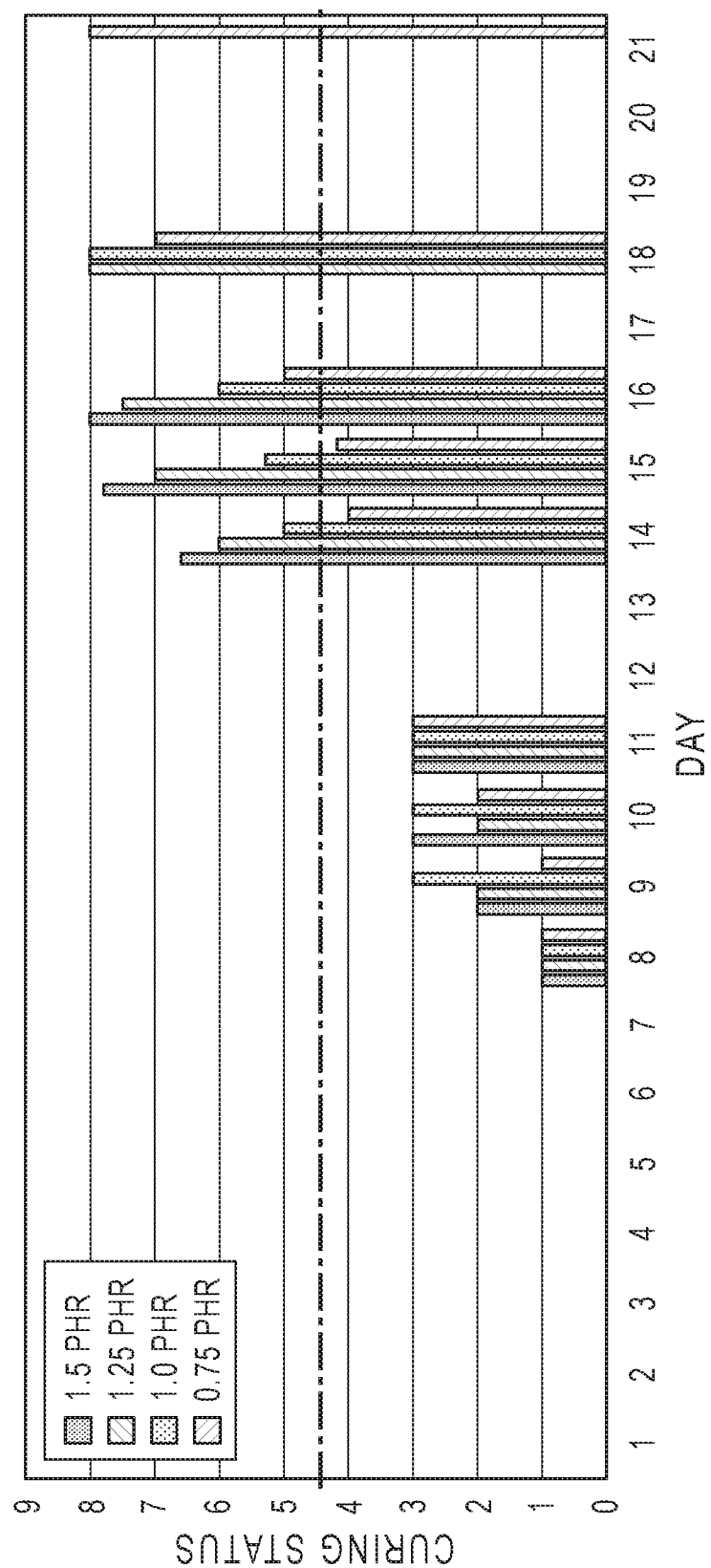
FIG. 3 shows the curing status with time of polyepoxide-cured polythioether sealants with different amounts of a combination of 2,2'-bipyridine and 4,4'-bipyridine.

Sealant compositions were prepared as in Example 1 with the catalyst being a 2:1 molar ratio of 2,2'-bipyridine and 4,4'-bipyridine. The sealant compositions had a different PHR of the combined bipyridine catalysts. The sealants were allowed to cure at room temperature and the status of the cure was monitored periodically and classified as shown in FIG. 3 according to the scale listed in Table 3. The results are summarized in Table 4.

TABLE 4

Effect of combined bipyridine catalyst PHR on curing status.

| | PHR Combined Catalyst | | | |
| --- | --- | --- | --- | --- |
| Curing Status | 1.5 PHR | 1.25 PHR | 1.0 PHR | 0.75 PHR |
| Working Time (days) | 12-13 | 12-13 | 12-13 | 15 |
| Additional Time to Cure (days) | 8-9 | 12-13 | 17-18 | 16 |
| Cure Time (days) | 21 | 25 | 30 | 31 |

The additional time to cure was estimated as the duration between the time after the sealant was no longer workable (working time) and the time the sealant exhibited hardness 30 Shore A (cure time).

Example 3

Effect of Bipyridine Catalyst Ratio

Sealant compositions were prepared as in Example 1 with a combination of 2,2'-bipyridine and 4,4'-bipyridine in the amount of 1.5 PHR.

The molar ratio of the 2,2'-bipyridine catalyst and 4,4'-bipyridine catalyst was varied from 2:1 to 16:1. The sealants were allowed to cure at room temperature and the status of the cure was monitored periodically and classified according to the scale listed in Table 3. The results are summarized in Table 5.

TABLE 5

Effect of bi(pyridine) catalyst ratio on cure time.

| Molar Ratio Slow:Fast Bipyridine Catalyst | Working Time (days) | Additional Time to Cure (days) | Cure Time (days) |
|---|---|---|---|
| 2:1 | 12-13 | 8-9 | 21 |
| 3:1 | 12-13 | 12-13 | 25 |
| 4:1 | 12-13 | 14-15 | 27 |
| 5:1 | 13 | 16 | 29 |
| 6:1 | 14 | 16 | 30 |
| 8:1 | 14-15 | 18-19 | 33 |
| 10:1 | 14-15 | 19-21 | 34-35 |
| 12:1 | 14-15 | 20-21 | 35 |
| 16:1 | 14-15 | 22-23 | 37 |

The additional time to cure was estimated as the duration between the time after the sealant was no longer workable (working time; classification 4.5 in Table 3) and the time the sealant exhibited hardness 30 Shore A (cure time; classification 10 in Table 3).

Aspects of the Invention

1. A composition comprising: (a) a thiol-terminated sulfur-containing prepolymer; (b) a polyepoxide; and (c) at least two pyridine catalysts.

2. The composition of aspect 1, wherein the thiol-terminated sulfur-containing prepolymer comprises a thiol-terminated polythioether prepolymer, a thiol-terminated polysulfide prepolymer, or a combination thereof.

3. The composition of any one of aspects 1 to 2, wherein the sulfur-containing prepolymer comprises a thiol-terminated polythioether prepolymer comprising the structure of Formula (1):

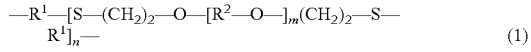

$$-R^1-[S-(CH_2)_2-O-[R^2-O-]_m(CH_2)_2-S-R^1]_n- \tag{1}$$

wherein,
each $R^1$ independently comprises a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a divalent heterocyclic group, or a $-[(CHR^3)_p-X-]_q(CHR^3)$, group, wherein each $R^3$ comprises hydrogen or methyl;
each $R^2$ independently comprises a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a divalent heterocyclic group, or a $-[(CH_2)_p-X-]_q(CH_2)$, group;
each X independently comprises O, S, or $-NR-$, wherein R comprises hydrogen or methyl;
m ranges from 0 to 50;
n is an integer ranging from 1 to 60;
p is an integer ranging from 2 to 6;
q is an integer ranging from 1 to 5; and
r is an integer ranging from 2 to 10.

4. The composition of any one of aspects 1 to 3, wherein the sulfur-containing prepolymer comprises a thiol-terminated polythioether of Formula (2a), a thiol-terminated polythioether of Formula (2b), or a combination thereof:

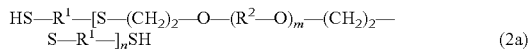

$$HS-R^1-[S-(CH_2)_2-O-(R^2-O)_m-(CH_2)_2-S-R^1-]_nSH \tag{2a}$$

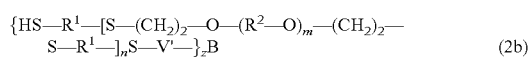

$$\{HS-R^1-[S-(CH_2)_2-O-(R^2-O)_m-(CH_2)_2-S-R^1-]_nS-V'-\}_zB \tag{2b}$$

wherein,
each $R^1$ independently comprises $C_{2-10}$ alkanediyl, $C_{6-8}$ cycloalkanediyl, $C_{6-14}$ alkanecycloalkanediyl, $C_{5-8}$ heterocycloalkanediyl, or $-[(CHR^3)_p-X-]_q(CHR^3)_r-$, wherein,
p is an integer from 2 to 6;
q is an integer from 1 to 5;
r is an integer from 2 to 10;
each $R^3$ independently comprises hydrogen or methyl; and
each X independently comprises $-O-$, $-S-$, or $-NR-$, wherein R comprises hydrogen or methyl;
each $R^2$ independently comprises $C_{1-10}$ alkanediyl, $C_{6-8}$ cycloalkanediyl, $C_{6-14}$ alkanecycloalkanediyl, or $-[(CHR^3)_p-X-](CHR^3)_r-$, wherein p, q, r, $R^3$, and X are as defined as for $R^1$;
m is an integer from 0 to 50;
n is an integer from 1 to 60;
B represents a core of a z-valent, polyfunctionalizing agent $B(-V)_z$ wherein,
z is an integer from 3 to 6; and
each V is a moiety comprising a terminal group reactive with a thiol; and
each $-V'-$ is derived from the reaction of $-V$ with a thiol.

5. The composition of any one of aspects 1 to 4, wherein the sulfur-containing prepolymer comprise a thiol-terminated polythioether prepolymer, wherein the thiol-terminated polythioether comprises the reaction product of reactants comprising:

(a) a dithiol of Formula (3):

$$HS-R^1-SH \tag{3}$$

wherein,
$R^1$ comprises $C_{2-6}$ alkanediyl, $C_{6-8}$ cycloalkanediyl, $C_{6-10}$ alkanecycloalkanediyl, $C_{5-8}$ heterocycloalkanediyl, or $-[(CHR^3)_p-X-]_q(CHR^3)_r-$;
wherein,
each $R^3$ independently comprises hydrogen or methyl;
each X independently comprises $-O-$, $-S-$, or $-NR-$ wherein R comprises hydrogen or methyl;
p is an integer from 2 to 6;
q is an integer from 1 to 5; and
r is an integer from 2 to 10; and (b) a divinyl ether of Formula (4):

$$CH_2=CH-O-[R^2-O]_m-CH=CH_2 \tag{4}$$

wherein,
each $R^2$ independently comprises $C_{1-10}$ alkanediyl, $C_{6-8}$ cycloalkanediyl, $C_{6-14}$ alkanecycloalkanediyl, or $-[(CHR^3)_p-X-]_q(CHR^3)_r-$ wherein p, q, r, $R^3$, and X are as defined for $R^1$; and
m is an integer from 0 to 50.

6. The composition of aspect 5, wherein the reactants further comprise (c) a polyfunctional compound $B(-V)_z$, wherein, B represents a core of a z-valent, polyfunctionalizing agent $B(-V)_z$ wherein, z is an integer from 3 to 6; and each V is a moiety comprising a terminal group reactive with a thiol; and each $-V'-$ is derived from the reaction of $-V$ with a thiol.

7. The composition of any one of aspects 1 to 6, wherein the thiol-terminated sulfur-containing prepolymer is characterized by an average thiol functionality from 2.05 to 2.8.

8. The composition of any one of aspects 1 to 7, wherein the polyepoxide comprises a novolac polyepoxide, a bisphenol A/epichlorohydrin derived polyepoxide, or a combination thereof.

9. The composition of any one of aspects 1 to 8, wherein the at least two pyridine catalysts comprise a bipyridine, a dialkylaminopyridine, or a combination thereof.

10. The composition of any one of aspects 1 to 9, wherein the at least two pyridine catalysts comprise: a first pyridine catalyst that when used as the only catalyst in the compositions provides a first working time; and a second pyridine catalyst that when used as the only catalyst in the composition provides a second working time, wherein the first working time is longer than the second working time; and wherein working time refers to the time from when the thiol-terminated sulfur-containing prepolymer, the polyepoxide and the amine catalyst are first mixed, to when the composition is no longer workable.

11. The composition of aspect 10, wherein the first working time is within a range from 12 days to 16 days.

12. The composition of any one of aspects 10 to 11, wherein, the first pyridine catalyst comprises 2,2'-bipyridine, 2-dimethylaminopyridine (2-DMAP), or a combination thereof; and the second pyridine catalyst comprises 4,4'-bipyridine, 4-dimethylaminopyridine (4-DMAP), or a combination thereof.

13. The composition of any one of aspects 1 to 12, wherein the at least two pyridine catalysts comprise: a first pyridine catalyst that when used as the only catalyst in the compositions provides a cure time longer than 12 days; and a second pyridine catalyst that when used as the only catalyst in the composition provides a cure time less than 12 days, wherein the cure time refers to the time from when the thiol-terminated sulfur-containing prepolymer, the polyepoxide and the amine catalyst are first mixed, to when the composition exhibits hardness 30 Shore A.

14. The composition of aspect 13, wherein, the first pyridine catalyst comprises 2,2'-bipyridine, 2-dimethylaminopyridine (2-DMAP), or a combination thereof; and the second pyridine catalyst comprises 4,4'-bipyridine, 4-dimethylaminopyridine (4-DMAP), or a combination thereof.

15. The composition of any one of aspects 1 to 14, wherein the at least two pyridine catalysts comprise 4,4'-bipyridine and 2,2'-bipyridine.

16. The composition of any one of aspects 1 to 15, wherein the at least two pyridine catalysts comprise 2-dimethylaminopyridine (2-DMAP) and 4-dimethylaminopyridine (4-DMAP).

17. The composition of any one of aspects 1 to 16, wherein the composition comprises from 0.5 PHR to 3 PHR of the at least two pyridine catalysts, wherein PHR refers to the parts by weight per 100 parts by weight of the thiol-terminated sulfur-containing prepolymer in the composition.

18. The composition of any one of aspects 1 to 17, wherein the at least two pyridine catalysts comprise: a first pyridine catalyst, wherein the first pyridine catalyst, when used as the only catalyst in the composition provides a first cure time; and a second pyridine catalyst, wherein the second pyridine catalyst, when used as the only catalyst in the composition provide a second cure time, wherein the second cure time is at least twice as long as the first cure time, wherein the cure time refers to the time from when the thiol-terminated sulfur-containing prepolymer, the polyepoxide, and the amine catalyst are first mixed, to when the composition exhibits hardness 30 Shore A.

19. The composition of any one of aspects 1 to 18, wherein the at least two pyridine catalysts comprise a molar ratio of 2,2'-bipyridine to 4,4'-bipyridine within a range from 1:1 to 3:1.

20. The composition of any one of aspects 1 to 19, wherein the composition further comprises (d) an amine catalyst.

21. The composition of any one of aspects 1 to 20, formulated as a sealant.

22. A cured sealant prepared from the composition of aspect 21.

23. A method of sealing one or more surfaces, comprising: applying the composition of aspect 21 to one or more surfaces; and curing the applied composition to seal the one or more surfaces.

24. A part comprising the cured sealant of aspect 21.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A composition comprising:
   (a) a thiol-terminated sulfur-containing prepolymer;
   (b) a polyepoxide; and
   (c) at least two pyridine catalysts, wherein the at least two pyridine catalysts comprise a bipyridine, a dialkylaminopyridine, or a combination thereof.

2. The composition of claim 1, wherein the thiol-terminated sulfur-containing prepolymer comprises a thiol-terminated polythioether prepolymer, a thiol-terminated polysulfide prepolymer, or a combination thereof.

3. The composition of claim 1, wherein the thiol-terminated sulfur-containing prepolymer comprises a thiol-terminated polythioether prepolymer comprising the structure of Formula (1):

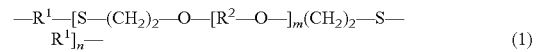

$$-R^1-[S-(CH_2)_2-O-[R^2-O-]_m(CH_2)_2-S-R^1]_n- \qquad (1)$$

wherein,
each $R^1$ independently comprises a $C_{2\text{-}10}$ n-alkanediyl group, a $C_{3\text{-}6}$ branched alkanediyl group, a $C_{6\text{-}8}$ cycloalkanediyl group, a $C_{6\text{-}10}$ alkanecycloalkanediyl group, a divalent heterocyclic group, or a $-[(CHR^3)_p-X-]_q(CHR^3)_r-$ group, wherein each $R^3$ comprises hydrogen or methyl;
each $R^2$ independently comprises a $C_{2\text{-}10}$ n-alkanediyl group, a $C_{3\text{-}6}$ branched alkanediyl group, a $C_{6\text{-}8}$ cycloalkanediyl group, a $C_{6\text{-}14}$ alkanecycloalkanediyl group, a divalent heterocyclic group, or a $-[(CH_2)_p-X-]_q(CH_2)_r-$ group;
each X independently comprises O, S, or $-NR-$, wherein R comprises hydrogen or methyl;
m ranges from 0 to 50;
n is an integer ranging from 1 to 60;
p is an integer ranging from 2 to 6;
q is an integer ranging from 1 to 5; and
r is an integer ranging from 2 to 10.

4. The composition of claim 1, wherein the thiol-terminated sulfur-containing prepolymer comprises a thiol-terminated polythioether prepolymer of Formula (2a), a thiol-terminated polythioether of prepolymer Formula (2b), or a combination thereof:

$$HS-R^1-[S-(CH_2)_2-O-(R^2-O)_m-(CH_2)_2-S-R^1-]_nSH \quad (2a)$$

$$\{HS-R^1-[S-(CH_2)_2-O-(R^2-O)_m-(CH_2)_2-S-R^1-]_nS-V'-\}_zB \quad (2b)$$

wherein,
  each $R^1$ independently comprises $C_{2-10}$ alkanediyl, $C_{6-8}$ cycloalkanediyl, $C_{6-14}$ alkanecycloalkanediyl, $C_{5-8}$ heterocycloalkanediyl, or $-[(CHR^3)_p-X-]_q(CHR^3)_r$, wherein,
    p is an integer from 2 to 6;
    q is an integer from 1 to 5;
    r is an integer from 2 to 10;
    each $R^3$ independently comprises hydrogen or methyl; and
    each X independently comprises —O—, —S—, or —NR—, wherein R comprises hydrogen or methyl;
  each $R^2$ independently comprises $C_{1-10}$ alkanediyl, $C_{6-8}$ cycloalkanediyl, $C_{6-14}$ alkanecycloalkanediyl, or $-[(CHR^3)_p-X-]_q-(CHR^3)_r$, wherein p, q, r, $R^3$, and X are as defined as for $R^1$;
  m is an integer from 0 to 50;
  n is an integer from 1 to 60;
  B represents a core of a z-valent, polyfunctionalizing agent $B(-V)_z$ wherein,
    z is an integer from 3 to 6; and
    each V is a moiety comprising a terminal group reactive with a thiol; and
  each —V'— is derived from the reaction of —V with a thiol.

5. The composition of claim 1, wherein the thiol-terminated sulfur-containing prepolymer comprises a thiol-terminated polythioether prepolymer, wherein the thiol-terminated polythioether prepolymer comprises the reaction product of reactants comprising:
  (a) a dithiol of Formula (3):

$$HS-R^1-SH \quad (3)$$

wherein,
    $R^1$ comprises $C_{2-6}$ alkanediyl, $C_{6-8}$ cycloalkanediyl, $C_{6-10}$ alkanecycloalkanediyl, $C_{5-8}$ heterocycloalkanediyl, or $-[(CHR^3)_p-X-]_q(CHR^3)_r$;
  wherein,
    each $R^3$ independently comprises hydrogen or methyl;
    each X independently comprises —O—, —S—, or —NR— wherein R comprises hydrogen or methyl;
    p is an integer from 2 to 6;
    q is an integer from 1 to 5; and
    r is an integer from 2 to 10; and
  (b) a divinyl ether of Formula (4):

$$CH_2=CH-O-[R^2-O]_m-CH=CH_2 \quad (4)$$

wherein,
    each $R^2$ independently comprises $C_{1-10}$ alkanediyl, $C_{6-8}$ cycloalkanediyl, $C_{6-14}$ alkanecycloalkanediyl, or $-[(CHR^3)_p-X-]_q(CHR^3)_r-$ wherein p, q, r, $R^3$, and X are as defined for $R^1$; and
    m is an integer from 0 to 50.

6. The composition of claim 5, wherein the reactants further comprise (c) a polyfunctional compound $B(-V)_z$, wherein,
  B represents a core of a z-valent, polyfunctionalizing agent $B(-V)_z$ wherein,
    z is an integer from 3 to 6; and
    each V is a moiety comprising a terminal group reactive with a thiol; and
  each —V'— is derived from the reaction of —V with a thiol.

7. The composition of claim 1, wherein the thiol-terminated sulfur-containing prepolymer is characterized by an average thiol functionality from 2.05 to 2.8.

8. The composition of claim 1, wherein the polyepoxide comprises a novolac polyepoxide, a bisphenol A/epichlorohydrin derived polyepoxide, or a combination thereof.

9. The composition of claim 1, wherein the at least two pyridine catalysts comprise:
  a first pyridine catalyst that when used as the only catalyst in the compositions provides a first working time; and
  a second pyridine catalyst that when used as the only catalyst in the composition provides a second working time,
  wherein the first working time is longer than the second working time; and
  wherein working time refers to the time from when the thiol-terminated sulfur-containing prepolymer, the polyepoxide and the amine catalyst are first mixed, to when the composition is no longer workable.

10. The composition of claim 9, wherein the first working time is within a range from 12 days to 16 days.

11. The composition of claim 9, wherein,
  the first pyridine catalyst comprises 2,2'-bipyridine, 2-dimethylaminopyridine (2-DMAP), or a combination thereof; and
  the second pyridine catalyst comprises 4,4'-bipyridine, 4-dimethylaminopyridine (4-DMAP), or a combination thereof.

12. The composition of claim 1, wherein the at least two pyridine catalysts comprise:
  a first pyridine catalyst that when used as the only catalyst in the compositions provides a cure time longer than 12 days; and
  a second pyridine catalyst that when used as the only catalyst in the composition provides a cure time less than 12 days,
  wherein the cure time refers to the time from when the thiol-terminated sulfur-containing prepolymer, the polyepoxide and the amine catalyst are first mixed, to when the composition exhibits hardness 30 Shore A.

13. The composition of claim 12, wherein,
  the first pyridine catalyst comprises 2,2'-bipyridine, 2-dimethylaminopyridine (2-DMAP), or a combination thereof; and
  the second pyridine catalyst comprises 4,4'-bipyridine, 4-dimethylaminopyridine (4-DMAP), or a combination thereof.

14. The composition of claim 1, wherein the at least two pyridine catalysts comprise 4,4'-bipyridine and 2,2'-bipyridine.

15. The composition of claim 1, wherein the at least two pyridine catalysts comprise 2-dimethylaminopyridine (2-DMAP) and 4-dimethylaminopyridine (4-DMAP).

16. The composition of claim 1, wherein the composition comprises from 0.5 PHR to 3 PHR of the at least two pyridine catalysts, wherein PHR refers to the parts by weight per 100 parts by weight of the thiol-terminated sulfur-containing prepolymer in the composition.

17. The composition of claim 1, wherein the at least two pyridine catalysts comprise:

a first pyridine catalyst, wherein the first pyridine catalyst, when used as the only catalyst in the composition provides a first cure time; and a second pyridine catalyst, wherein the second pyridine catalyst, when used as the only catalyst in the composition provide a second cure time, wherein the second cure time is at least twice as long as the first cure time, wherein the cure time refers to the time from when the thiol-terminated sulfur-containing prepolymer, the polyepoxide, and the amine catalyst are first mixed, to when the composition exhibits hardness 30 Shore A.

18. The composition of claim 1, wherein the at least two pyridine catalysts comprise a molar ratio of 2,2'-bipyridine to 4,4'-bipyridine within a range from 1:1 to 3:1.

19. The composition of claim 1, wherein the composition further comprises (d) an amine catalyst.

20. The composition of claim 1, formulated as a sealant.

21. A cured sealant prepared from the composition of claim 20.

22. A method of sealing one or more surfaces, comprising:
applying the composition of claim 20 to one or more surfaces; and
curing the applied composition to seal the one or more surfaces.

23. The method of claim 22, wherein the surface comprises a surface of an aerospace vehicel.

24. A part comprising the cured sealant of claim 21.

25. The part of claim 24, wherein the part is an aerospace vehicle part.

* * * * *